(12) United States Patent
Kawanishi et al.

(10) Patent No.: US 10,538,454 B2
(45) Date of Patent: Jan. 21, 2020

(54) OPTICAL FIBER CUTTER

(71) Applicant: FUJIKURA LTD., Tokyo (JP)

(72) Inventors: Noriyuki Kawanishi, Sakura (JP); Katsumi Sasaki, Sakura (JP)

(73) Assignee: Fujikura Ltd., Tokyo (JP)

(\*) Notice: Subject to any disclaimer, the term of this patent is extended or adjusted under 35 U.S.C. 154(b) by 223 days.

(21) Appl. No.: 15/545,905

(22) PCT Filed: Mar. 22, 2017

(86) PCT No.: PCT/JP2017/011414
§ 371 (c)(1),
(2) Date: Jul. 24, 2017

(87) PCT Pub. No.: WO2018/163441
PCT Pub. Date: Sep. 13, 2018

(65) Prior Publication Data
US 2018/0334406 A1  Nov. 22, 2018

(30) Foreign Application Priority Data

Mar. 6, 2017 (JP) ................................. 2017-042168

(51) Int. Cl.
*C03B 33/12* (2006.01)
(52) U.S. Cl.
CPC ................... *C03B 33/12* (2013.01)
(58) Field of Classification Search
CPC ........ G02B 6/25; G02B 6/3822; C03B 37/16; C03B 33/12; Y10T 83/0393;

(Continued)

(56) References Cited

U.S. PATENT DOCUMENTS

| 4,790,464 A | 12/1988 | Bortolin et al. |
| 5,395,025 A * | 3/1995 | Borer ........................ G02B 6/25 |
| | | 225/102 |

(Continued)

FOREIGN PATENT DOCUMENTS

| CN | 101802664 A | 8/2010 |
| CN | 102152325 A | 8/2011 |

(Continued)

OTHER PUBLICATIONS

Office Action issued in corresponding Korean Application No. 10-2017-7019377 dated Oct. 16, 2018 (6 pages).

(Continued)

*Primary Examiner* — Ghassem Alie
(74) *Attorney, Agent, or Firm* — Osha Liang LLP

(57) ABSTRACT

An optical fiber cutter includes a device main body that includes a lid rotatably mounted with respect to a base and grips an optical fiber by an at least one lower gripper provided on the base and an upper gripper provided on the lid; a movable blade member that scratches a surface of the optical fiber gripped between the lower gripper and the upper gripper; and a pressing portion that presses the optical fiber scratched by the blade member to cut the optical fiber, wherein the at least one lower gripper is a gripping member separate from the base and is rotatable about a rotation fulcrum, and wherein a rotation fulcrum of the upper gripper paired with the at least one lower gripper is on the same center line as the rotation fulcrum of the at least one lower gripper.

11 Claims, 17 Drawing Sheets

(58) Field of Classification Search
CPC .............. Y10T 583/955; Y10T 225/321; Y10T 225/364; Y10T 225/12; Y10T 225/325; Y10T 83/0333; Y10T 225/03441; Y10T 83/00; Y10T 225/10; B26D 7/2635; B26D 3/08
USPC ..... 83/375, 887, 880, 879; 225/2, 96.5, 102, 225/96, 1, 105; 385/137, 136, 95–99, 83, 385/65

See application file for complete search history.

(56) References Cited

U.S. PATENT DOCUMENTS

| | | | |
|---|---|---|---|
| 7,292,765 B2 * | 11/2007 | Sato | G02B 6/2551 385/136 |
| 2006/0201986 A1 | 9/2006 | Sasaki et al. | |
| 2008/0178724 A1 | 7/2008 | Honma | |
| 2010/0187276 A1 * | 7/2010 | Ohmura | G02B 6/25 225/2 |
| 2011/0075982 A1 | 3/2011 | Christopher et al. | |
| 2013/0075440 A1 | 3/2013 | Hasegawa et al. | |
| 2014/0000434 A1 * | 1/2014 | Hasegawa | G02B 6/25 83/887 |
| 2014/0003785 A1 * | 1/2014 | Sato | G02B 6/3616 385/137 |

FOREIGN PATENT DOCUMENTS

| | | |
|---|---|---|
| CN | 202837588 U | 3/2013 |
| CN | 104260129 A | 1/2015 |
| CN | 205735078 U | 11/2016 |
| CN | 205958793 U | 2/2017 |
| CN | 206833028 U | 1/2018 |
| EP | 1734387 A1 | 12/2006 |
| EP | 2182397 A1 | 5/2010 |
| JP | 2850910 B2 | 1/1999 |
| JP | 2001-322086 A | 11/2001 |
| JP | 2006-251034 A | 9/2006 |
| JP | 5065800 B2 | 11/2012 |
| JP | 5200064 B2 | 5/2013 |
| JP | 2013-137445 A | 7/2013 |
| JP | 5877144 B2 | 3/2016 |
| WO | 2005/088370 A1 | 9/2005 |
| WO | 2009/066544 A1 | 5/2009 |

OTHER PUBLICATIONS

Notice of Allowance in counterpart Japanese Patent Application No. 2017-042168 dated Oct. 17, 2017 (3 pages).
European Extended Search Report issued in corresponding European Patent Application 17736554.1 dated Jan. 28, 2019 (7 pages).
Japanese Office Action issued in corresponding application No. 2017-042168 dated Jun. 6, 2017 (3 pages).
Notice of Allowance issued in corresponding Korean Patent Application No. 10-2017-7019377 dated Mar. 28, 2019 (2 pages).

* cited by examiner

OPTICAL FIBER CUTTER

TECHNICAL FIELD

The present invention relates to an optical fiber cutter including a blade member which is built therein and is used to cut an optical fiber.

This application claims priority from Japanese Patent Application No. 2017-042168, filed on Mar. 6, 2017, the contents of which are incorporated herein by reference in their entirety.

BACKGROUND ART

There are various kinds of optical fiber cutters. Patent Documents 1 to 4 describe an optical fiber cutter having the following configuration.
(1) An optical fiber cutter includes a base and a lid.
(2) The lid is rotatably mounted with respect to the base.
(3) The optical fiber can be gripped by a lower gripper provided at the base and an upper gripper provided at the lid.
(4) There are two gripping mechanisms each including the lower gripper and the upper gripper, and it is possible to grip the optical fiber at two positions in a longitudinal direction.
(5) A movable blade member is installed substantially at a middle portion between the two gripping mechanisms in the longitudinal direction.
(6) The optical fiber can be scratched by bringing the blade member into contact with a surface of the optical fiber.
(7) The optical fiber can be cut by pressing the scratched optical fiber with a pressing member provided at the lid.

PRIOR ART DOCUMENTS

Patent Documents

[Patent Document 1] Japanese Patent No. 2850910
[Patent Document 2] Japanese Patent No. 5877144
[Patent Document 3] Japanese Patent No. 5200064
[Patent Document 4] Japanese Patent No. 5065800

Generally, since an optical fiber is made of hard glass, a tool using a hard metal alloy, diamond, or the like is used as a blade member that comes into contact with the optical fiber at the time of cutting. Conventionally, a complicated process has been required at the time of work such as replacement of the blade member to adjust a positional correlation of the blade member with the optical fiber or with a gripper.

SUMMARY

One or more embodiments of the invention provide an optical fiber cutter capable of facilitating an operation of adjusting a positional correlation of a blade member with an optical fiber or with a gripper.

An optical fiber cutter according to one or more embodiments may include a lid rotatably mounted with respect to a base and is capable of gripping an optical fiber by a lower gripper provided on the base and an upper gripper provided on the lid; a movable blade member configured to scratch a surface of the optical fiber gripped between the lower gripper and the upper gripper from the base; and a pressing portion configured to press the optical fiber scratched by the blade member to cut the optical fiber, wherein at least one of the lower grippers is configured as a gripping member which is a member separate from the base and is rotatable about a rotation fulcrum, and a rotation fulcrum of the upper gripper paired with the at least one of the lower grippers is on the same center line as the rotation fulcrum of the at least one of the lower grippers.

An optical fiber cutter according to one or more embodiments may further include two sets of gripping mechanisms, each of which is formed with the upper gripper and the lower gripper which face each other in a longitudinal direction of the optical fiber.

An optical fiber cutter according to one or more embodiments may further include a gripping member configured as one member formed with two lower grippers and a rotation fulcrum serving as a rotational center common to the two lower grippers.

According to one or more embodiments, the gripping member may include the rotation fulcrum on a base end, and the base may include a displacement mechanism configured to vertically displace a distal end on the distal end opposite to the base end of the gripping member.

According to one or more embodiments, two sets of gripping members, each of which is configured as one member formed with the one lower gripper and the rotation fulcrum serving as a rotational center of the lower gripper, are provided.

According to one or more embodiments, two sets of gripping members may include the rotation fulcrum on a base end, and the base may include two displacement mechanisms configured to vertically displace distal ends on a distal end opposite to the base end with respect to each of the two sets of gripping members.

According to one or more embodiments, two sets of gripping members may include the rotation fulcrum on the base end, and the base may include a displacement mechanism configured to vertically displace the distal ends of the two sets of gripping members on a distal end opposite to the base end in conjunction with each other.

According to one or more embodiments, each rotation fulcrum provided in the two sets of gripping members may be disposed on the same center line.

According to one or more embodiments, the lower grippers provided in the two sets of gripping members may be rotatable in conjunction with each other.

According to one or more embodiments, each of the two sets of gripping members may include the upper gripper facing the lower gripper, and the two upper grippers may be rotatable in conjunction with each other.

According to one or more embodiments, the pressing portion may be configured as a member separate from the lid, and the pressing portion, the upper gripper, and the lower gripper may be rotatable about a rotation fulcrum on the same center line.

According to one or more embodiments, a rotation fulcrum that allows the lid to rotate with respect to the base may be disposed on the same center line as a rotation fulcrum of the upper gripper and the lower gripper.

According to one or more embodiments, two or more members may be selected from a group comprising: (1) a gripping member including the one lower gripper, (2) a gripping member including the two lower grippers, (3) a gripping member including the one upper gripper, (4) a gripping member including the two upper grippers, and (5) a pressing member including the pressing portion may be provided. Furthermore, those two or more members may be able to be integrated in a mutually rotatable state by being coupled at a portion of the rotation fulcrum, and detachably attached to the base and the lid.

According to one or more embodiments, the gripping member rotatable about the rotation fulcrum may be detachably attached to the base.

According to one or more embodiments of the present invention, the operation of adjusting a positional correlation of a blade member with an optical fiber or with a gripper can be facilitated.

BRIEF DESCRIPTION OF THE DRAWINGS

FIG. 5 is an exploded perspective view showing an example of a blade member or the like.

EMBODIMENTS FOR CARRYING OUT THE INVENTION

Figure 1:
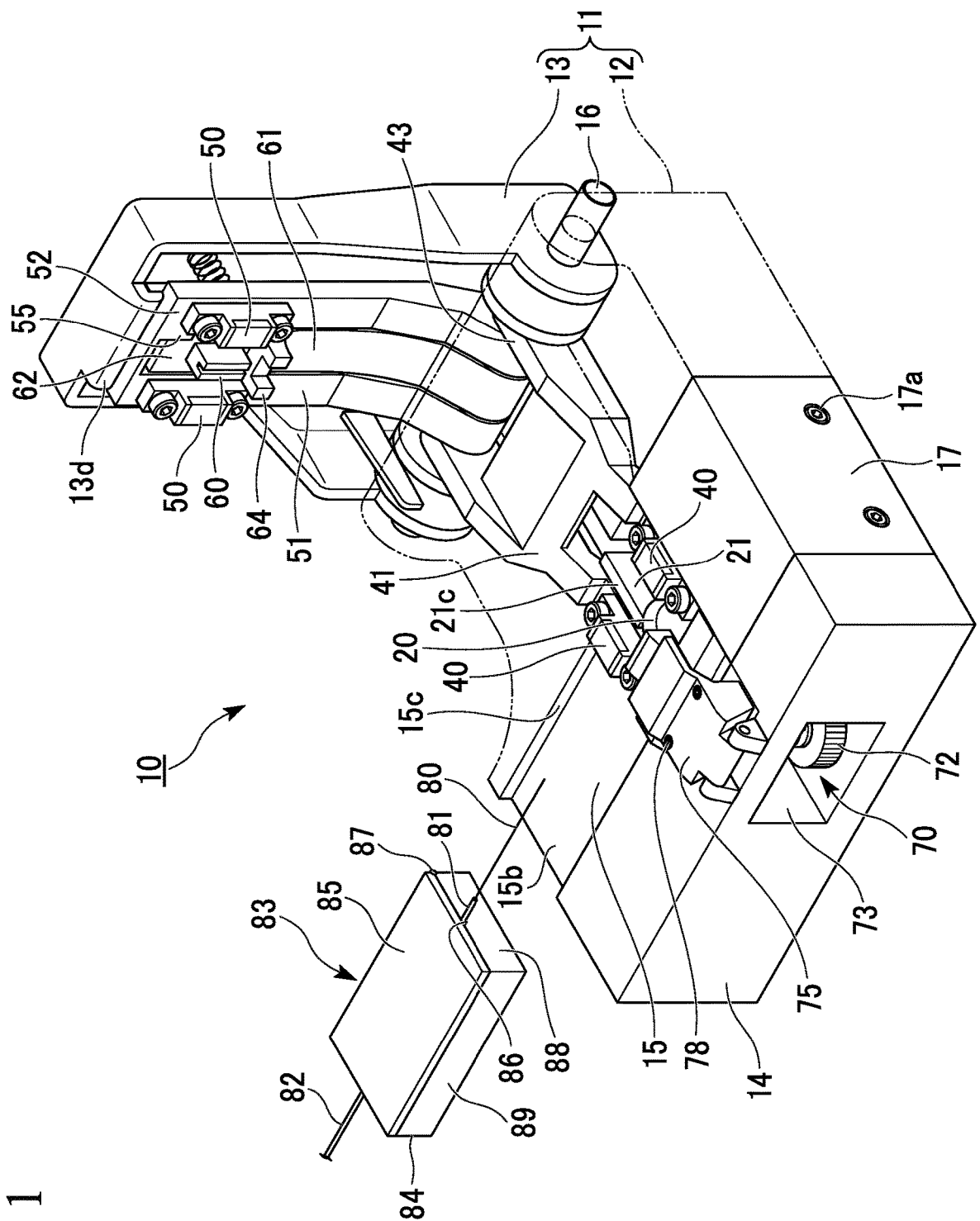
FIG. 1 is a perspective view showing an optical fiber cutter of one or more embodiments.

Hereinafter, embodiments of the invention will be described with reference to the accompanying drawings.

FIGS. 1 to 8 show an optical fiber cutter of one or more embodiments. An optical fiber cutter 10 of one or more embodiments includes a device main body 11 in which a lid 13 is rotatably mounted with respect to a base 12, and a movable blade member 20 that is built in the base 12.

As shown in FIG. 1, an optical fiber 80 to be subjected to a cutting process by the blade member 20 is, for example, a bare optical fiber that is exposed by a coating 81 being removed in a distal end of an optical fiber wire 82. The optical fiber wire 82 may be held by a fiber holder 83, for example. The fiber holder 83 exemplarily shown includes a base plate 84 on which the optical fiber wire 82 is to be placed and a cover plate 85 provided to be openable and closable on the base plate 84.

An optical fiber may be a single core optical fiber or a multicore optical fiber. The multicore optical fiber may be a ribbon. The optical fiber may be a single core fiber having a single core in a cross section of a cladding or a multicore fiber having a plurality of cores in a cross section of a cladding. A diameter of the optical fiber is not particularly limited, but a range of 50 to 1000 μm or the like may be an example.

The optical fiber wire 82 is placed on a groove 86 that is formed on the base plate 84, the cover plate 85 covers the optical fiber wire 82, and thereby the optical fiber wire 82 can be gripped and fixed, for example. A hinge 87 is provided between the base plate 84 and the cover plate 85 at a lateral surface parallel to the groove 86, for example, so that the cover plate 85 can be configured to be rotatable about the hinge 87.

A method of fixing the optical fiber wire 82 to the fiber holder 83 is not particularly limited, however, for example, a method of providing a permanent magnet (not shown) at a position on the base plate 84 other than the groove 86 and providing a magnetic material that can be attracted by magnetism on the cover plate 85. According to this configuration, pressing for gripping the optical fiber wire 82 is generated due to a magnetic attractive force acting between the base plate 84 and the cover plate 85.

A holder-loading table 15 on which the fiber holder 83 is to be placed is formed on a housing 14 of the base 12. The housing 14 includes a stopper 15a (refer to FIG. 4) that can be brought into contact with a front surface 88 of the fiber holder 83 and is near the blade member 20 of the holder-loading table 15.

A distance by which the optical fiber 80 protrudes from the front surface 88 of the fiber holder 83 is adjusted so that the optical fiber 80 to be cut is positioned over the blade member 20 when the fiber holder 83 is positioned by the stopper 15a.

The holder-loading table 15 includes an introduction portion 15b that is provided on the opposite side of the stopper 15a and is configured to receive the fiber holder 83 from a lateral side of the device main body 11. A movement direction of the fiber holder 83 is a direction from the introduction portion 15b toward the stopper 15a. Also, in a width direction intersecting the movement direction, it is possible that a guide 15c by which a path of the fiber holder 83 is guided be provided on the holder-loading table 15. As the guide 15c, for example, a mechanism may be adopted in which both side portions of the holder-loading table 15 guide both lateral surfaces 89 of the fiber holder 83. Alternatively, a rail-shaped structure that is parallel to the movement direction may be provided on the holder-loading table 15.

When the optical fiber 80 held by the fiber holder 83 is positioned with respect to the device main body 11, the fiber holder 83 may slide from the introduction portion 15b to the stopper 15a. Accordingly, the optical fiber 80 can be positioned with high accuracy with respect to the blade member 20 in the movement direction and a direction intersecting the movement direction.

Figure 2:
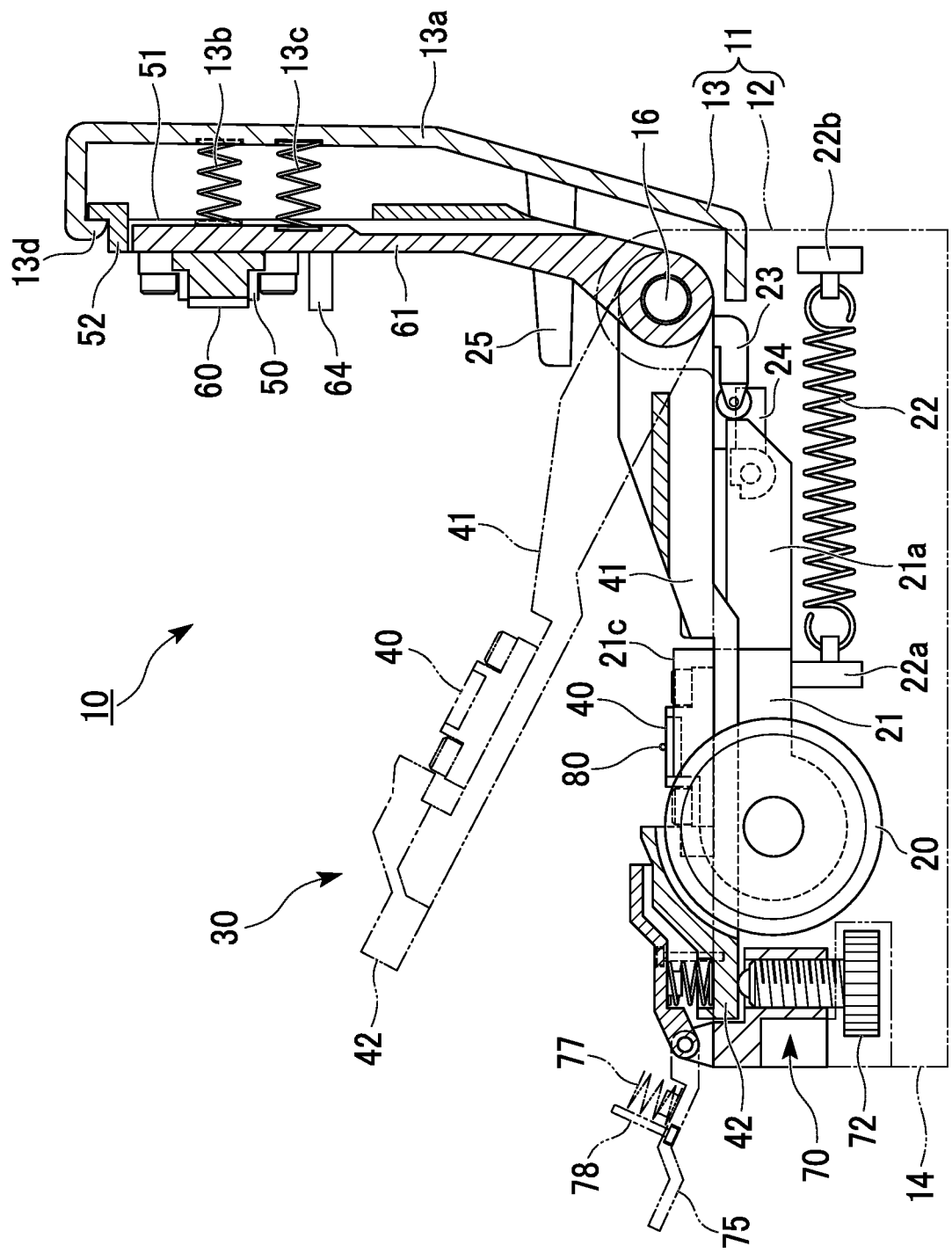
FIG. 2 is a cross-sectional view showing the optical fiber cutter of one or more embodiments.

As shown in FIGS. 1 and 2, the optical fiber cutter 10 includes a gripping mechanism 30 configured to grip the optical fiber 80. The gripping mechanism 30 includes a lower gripper 40 provided on near the base 12 and an upper gripper 50 provided on near the lid 13. The optical fiber 80 can be gripped between the lower gripper 40 and the upper gripper 50 which face each other.

The lower gripper 40 is provided on a lower gripping member 41 which is rotatable about a rotation shaft member 16. The lower gripping member 41 is a member configured to support the lower gripper 40 and the lower gripping member 41 of one or more embodiments is an arm-shaped member.

The upper gripper 50 is provided on an upper gripping member 51 which is rotatable about the rotation shaft member 16. The upper gripping member 51 is a member configured to support the upper gripper 50. The upper gripping member 51 of one or more embodiments is an arm-shaped member.

The lower gripper 40 and the upper gripper 50 are provided respectively at two positions in a longitudinal direction of the optical fiber 80. Therefore, the two sets of gripping mechanism 30 including the lower gripper 40 and the upper gripper 50 which face each other are formed in the longitudinal direction of the optical fiber 80. The lower gripping member 41 is configured as an integrated member including the two lower grippers 40. The upper gripping member 51 is configured as an integrated member including the two upper grippers 50.

The blade member 20 is disposed between the two lower grippers 40. A pressing portion 60 is disposed between the two upper grippers 50. The pressing portion 60 provided on near the lid 13 can press the optical fiber 80 to cut the optical fiber 80. The pressing portion 60 is provided at a pressing member 61 which is rotatable about the rotation shaft member 16. The pressing member 61 is a member configured to support the pressing portion 60. The pressing member 61 of one or more embodiments is an arm-shaped member.

The blade member 20 has only to be able to scratch the optical fiber 80 from which the coating 81 is removed.

A surface of the optical fiber 80 is scratched from the base 12 by the blade member 20. The pressing portion 60, with respect to the scratch formed on a surface on the lower side of the optical fiber 80, presses a surface on the upper side of the optical fiber 80 which is on the opposite side of the scratch. When the pressing portion 60 presses the optical fiber 80, the scratch is induced in a certain direction in a form such as cleaving and thus a cut surface substantially perpendicular to the longitudinal direction can be obtained.

The direction in which the optical fiber 80 is scratched by the blade member 20 may not necessarily be substantially exactly perpendicular to the longitudinal direction. Although the optical fiber 80 is made of glass and anisotropy such as cleaving in a crystalline material is not inherent in a glass material, the scratch can be induced in a predetermined direction when the optical fiber 80 is pressed and bent by the pressing portion 60.

A shape or an operation method of the blade member 20 is not particularly limited, but the blade member 20 is movable and operable in a direction crossing the longitudinal direction of the optical fiber 80 as shown in FIG. 2. A spring 22 configured to move a blade table 21 supporting the blade member 20 by an elastic force may be built in the housing 14, for example. Opposite ends of the spring 22 are held by spring holders 22a and 22b which are close to the blade table 21 and the housing 14, respectively.

The spring 22 of the shown example is a tension spring and the blade member 20 can move at a high speed when the extended spring 22 is restored in a contraction direction. A push-spring can be used as the spring. In this case, the blade member 20 can move at a high speed when a contracted spring is restored in an extension direction.

Figure 3:
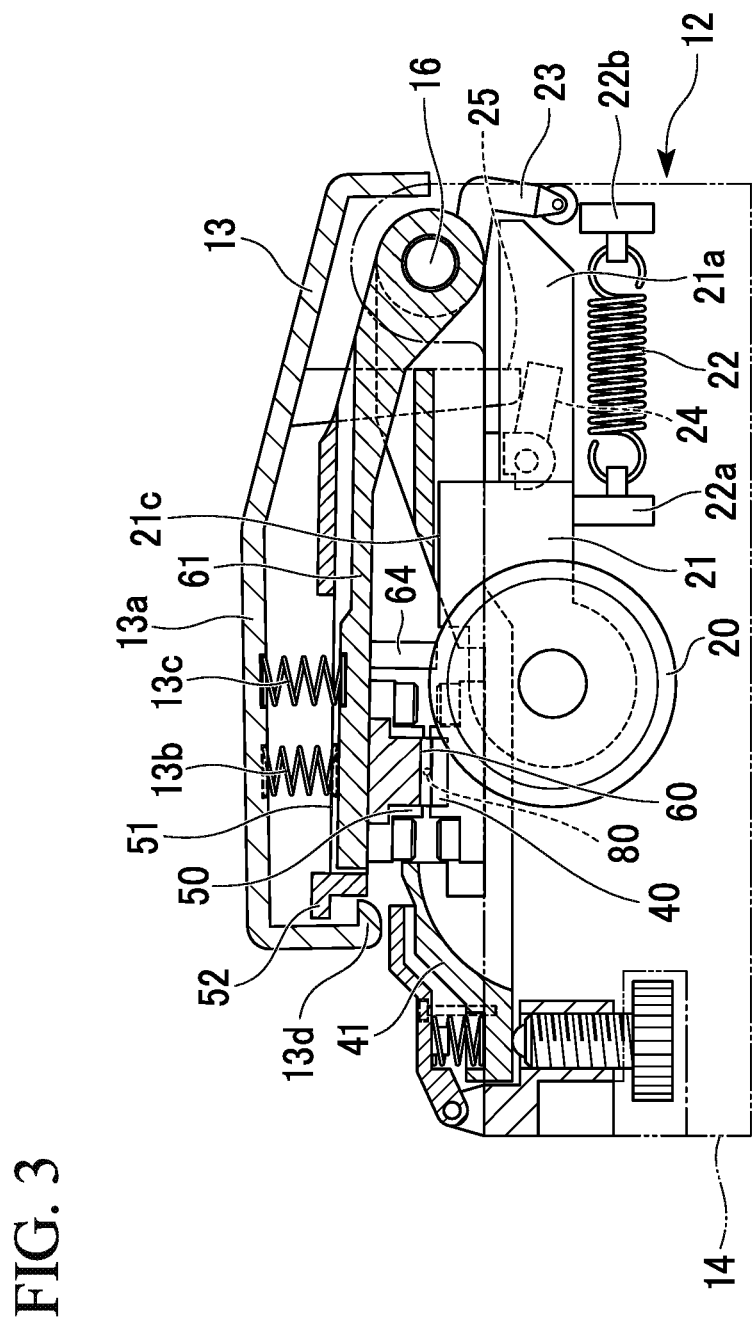
FIG. 3 is a cross-sectional view showing the optical fiber cutter of one or more embodiments.

FIG. 2 shows a state in which the lid 13 is open with respect to the base 12, whereas FIG. 3 shows a state in which the lid 13 is closed with respect to the base 12. The lid 13 can be rotatable about the rotation shaft member 16 with respect to the base 12. In a configuration in which the blade table 21 moves due to an elastic force of the spring 22, expansion and contraction of the spring 22 can be controlled by manipulating the blade table 21 near the base 12 in conjunction with the operation of the lid 13.

A push-in protrusion 23 is provided at a rear end 21a of the blade table 21 in conjunction with rotation of the lid 13. When the lid 13 is opened, the push-in protrusion 23 pushes the rear end 21a of the blade table 21, and thereby the blade table 21 moves in a direction in which an elastic force is applied to the spring 22. Since a locking portion 24 is provided in the base 12, an operation of the blade table 21 can be stopped in a state in which an elastic force is applied to the spring 22.

As an operation after the optical fiber 80 is placed on the lower gripper 40 and preparation for cutting is completed, it is only necessary for an operator to rotate the lid 13 to close it with respect to the base 12.

When the lid 13 is closed with respect to the base 12, the upper gripper 50 provided at the lid 13 comes into contact with the optical fiber 80 and thus both sides in the longitudinal direction of the optical fiber 80 to be cut are gripped between the lower gripper 40 and the upper gripper 50.

Also, when a positioner 64 provided on the pressing member 61 and a positioner 21c (refer to FIG. 1) provided at the blade table 21 come into contact with each other, the pressing portion 60 is positioned above the optical fiber 80.

Also, a release protrusion 25 near the lid 13 comes into contact with the locking portion 24 and thus the lock of the locking portion 24 on the blade table 21 is released. Accordingly, the spring 22 is restored from elastic deformation and thus the blade member 20 on the blade table 21 moves at a high speed. A surface of the optical fiber 80 to be cut is scratched by its coming into contact with the moving blade member 20.

Furthermore, as the positioner 21c moves with the blade table 21, the contact of the positioner 64 with the blade table 21 is released. When the pressing portion 60 comes into contact with the optical fiber 80 due to an elastic force of a spring 13c behind the pressing portion 60, a scratch of the optical fiber 80 grows and thus the optical fiber 80 is cut. The timing of cutting by the pressing portion 60 can be adjusted by changing the timing of releasing the contact of the positioner 64 with respect to the blade table 21.

The processes of gripping, scratching, pressing, and cutting the optical fiber 80 are realized as a series of operations by merely closing the lid 13 with respect to the base 12. A spring 13b is provided between the upper gripping member 51 and a rear surface 13a of the lid 13. A gripping force with respect to the optical fiber 80 gripped between the lower gripper 40 and the upper gripper 50 can be secured due to an elastic force of the spring 13b. Also, the spring 13c is provided between the pressing member 61 and the rear surface 13a of the lid 13. A pressing force of the pressing portion 60 with respect to the optical fiber 80 can be adjusted due to an elastic force of the spring 13c. The springs 13b and 13c are compression coil springs, for example, but the invention is not particularly limited thereto. A difference may be provided between the elastic forces of the springs 13b and 13c.

A locking portion 13d is provided at an end of the lid 13 to lock a distal end 52 of the upper gripping member 51 into the lid 13 against an applied force from the spring 13b. Thus, in a state in which the upper gripping member 51 is rotatably connected to the lid 13, the distal end 52 of the upper gripping member 51 is accommodated within an area between the rear surface 13a and the locking portion 13d in the lid 13, and thus the upper gripping member 51 is prevented from protruding. Also, when the lid 13 is opened with respect to the base 12, the upper gripping member 51 can follow the lid 13 and be lifted due to the locking of the locking portion 13d.

The upper gripping member 51 and the pressing member 61 are independently rotatable, and thus a displacement of the upper gripping member 51 due to the spring 13b and a displacement of the pressing member 61 due to the spring 13c can be performed independently.

A front restrictor 55 (refer to FIG. 1) is provided at the distal end 52 of the upper gripping member 51.

When the lid 13 is opened with respect to the base 12, the pressing member 61 can follow the upper gripping member 51 and be lifted due to the locking of the front restrictor 55.

Also, when a gripping mechanism member 31 or 33 (refer to FIGS. 8 and 10) to be described below is detached from the lid 13, since the pressing member 61 is not directly locked into the lid 13, when the rotation shaft member 16 is pulled out and then the locking of the upper gripping member 51 on the locking portion 13d of the lid 13 is released, the upper gripping member 51 and the pressing member 61 can be collectively detached from the lid 13.

The front restrictor 55 is not necessarily provided at the upper gripping member 51, and a position, a shape, a configuration, or the like of the front restrictor 55 can be appropriately changed.

The lower gripping member 41 having the lower gripper 40 is configured as a separate member from the base 12. Also, the lower gripper 40 is rotatable about a rotation fulcrum. As shown in FIG. 2, the lower gripper 40 can be pulled apart from the blade member 20 by rotating the lower gripping member 41 with respect to the housing 14 of the base 12.

Conventionally, since the blade member is accommodated inside the optical fiber cutter, a complicated process is required at the time of work such as replacement of the blade member.

Figure 4:
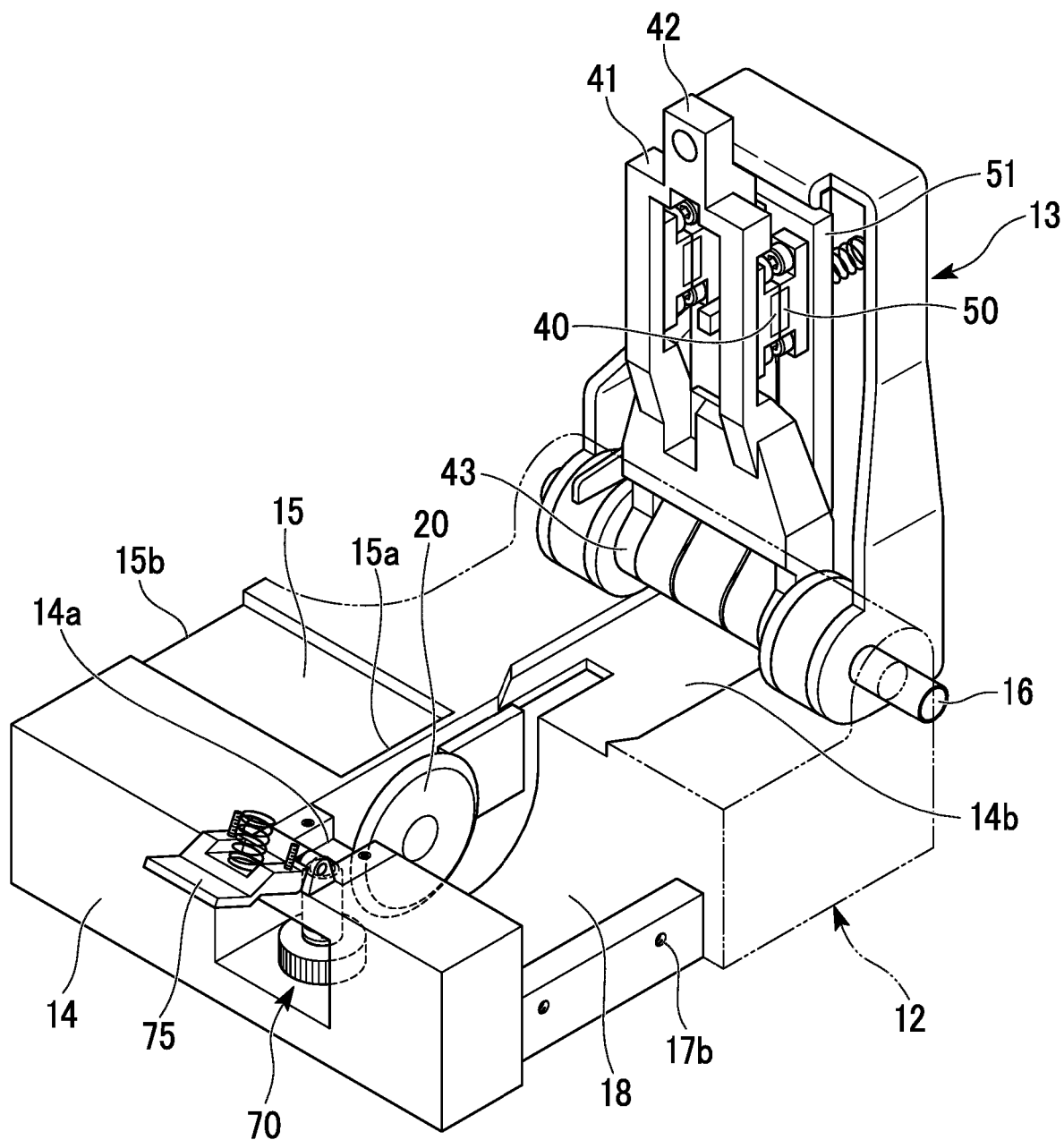
FIG. 4 is a perspective view showing the optical fiber cutter of one or more embodiments.

As shown in FIG. 4, since a wide opening 18 is formed around the blade member 20 when the lower gripping member 41 is raised upward, work such as replacement of the blade member 20 is facilitated. In addition, a state of the blade member 20 can be easily checked visually or the like in the opening 18.

The opening 18 may be covered with a cover portion 17 (refer to FIG. 1) provided on a side portion of the housing 14. The cover portion 17 can be detachably fixed to the housing 14 using a fixing member 17a such as a screw with respect to a fixing hole 17b near the housing 14. As shown in FIG. 1, since the periphery of the blade member 20 is covered when the lower gripping member 41 is lowered, the cover portion 17 near the housing 14 may be omitted.

Figure 5:
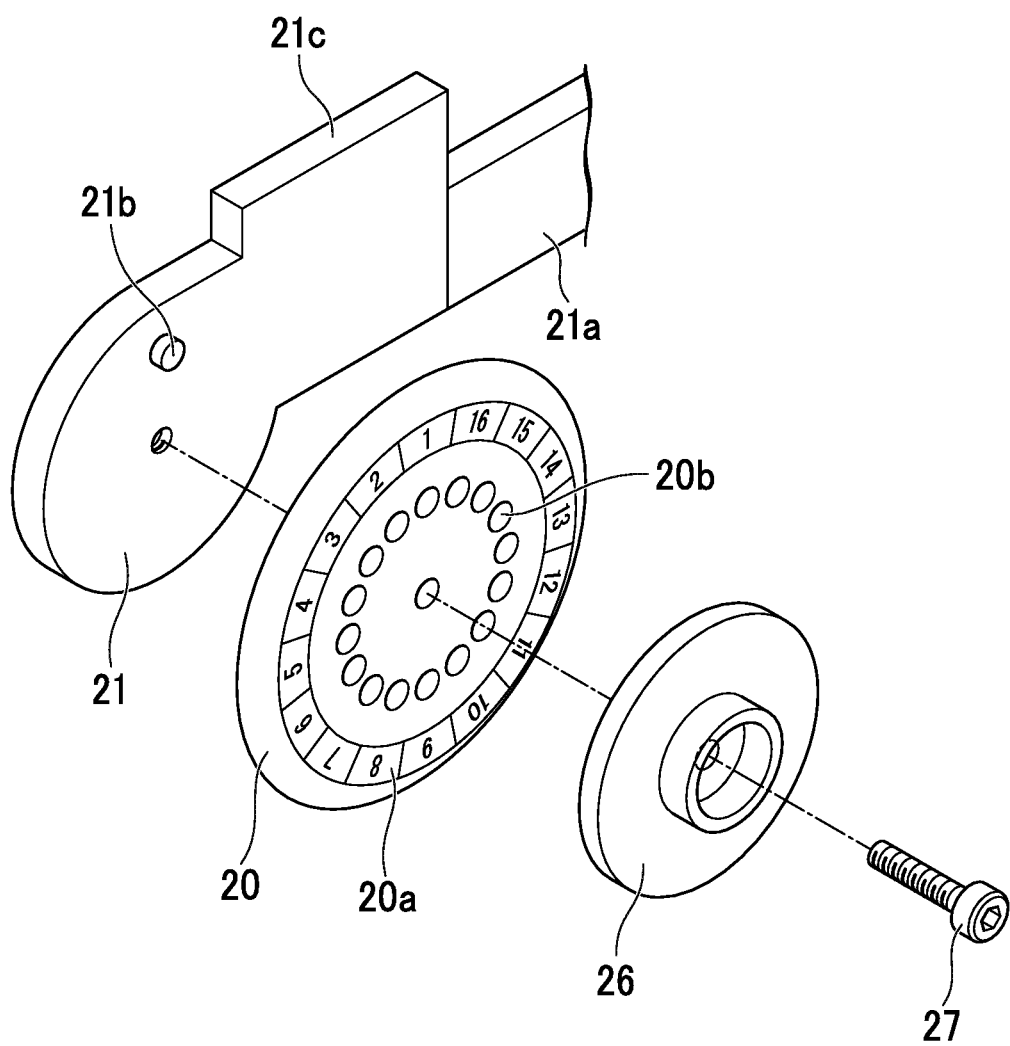

FIG. 5 shows an example of a mounting structure of the blade member 20 with respect to the blade table 21. The blade member 20 is inserted between the blade table 21 and a hold-down member 26 and is fixed by a fixing member 27 such as a screw. In the shown example, an entire circumference of the blade member 20 is divided into 16 equal sections, and the optical fiber 80 can be scratched within a section of a range corresponding to one-sixteenth of the circumference. Also, the periphery of the blade member 20 can be divided into an arbitrary number of sections without being limited to 16 equal sections. A scale 20a may be provided on the blade member 20 to distinguish each section. A planar shape of the blade member 20 is a circular shape, a polygonal shape, or the like, for example, but the invention is not particularly limited thereto.

Different sections of the blade member 20 can be used for scratching by changing a position at which a pin 21b is inserted into an engagement hole 20b of the blade member 20. When the blade member 20 is repeatedly used, it is possible to limit abrasion of a blade edge from being biased to a specific section. Accordingly, a lifetime of the blade member 20 can be prolonged by suitably managing the number of times the blade member 20 is used to cut the optical fiber 80 within a range of the lifetime of one blade member 20. The work of mounting an original blade member 20 on the blade table 21 can be performed in the same manner as in the case of replacing with a new blade member 20. As described above, the work of attaching and detaching the blade member 20 to and from the blade table 21 can be easily performed in a state in which the lower gripping member 41 is flipped up from the base 12.

Figure 6:
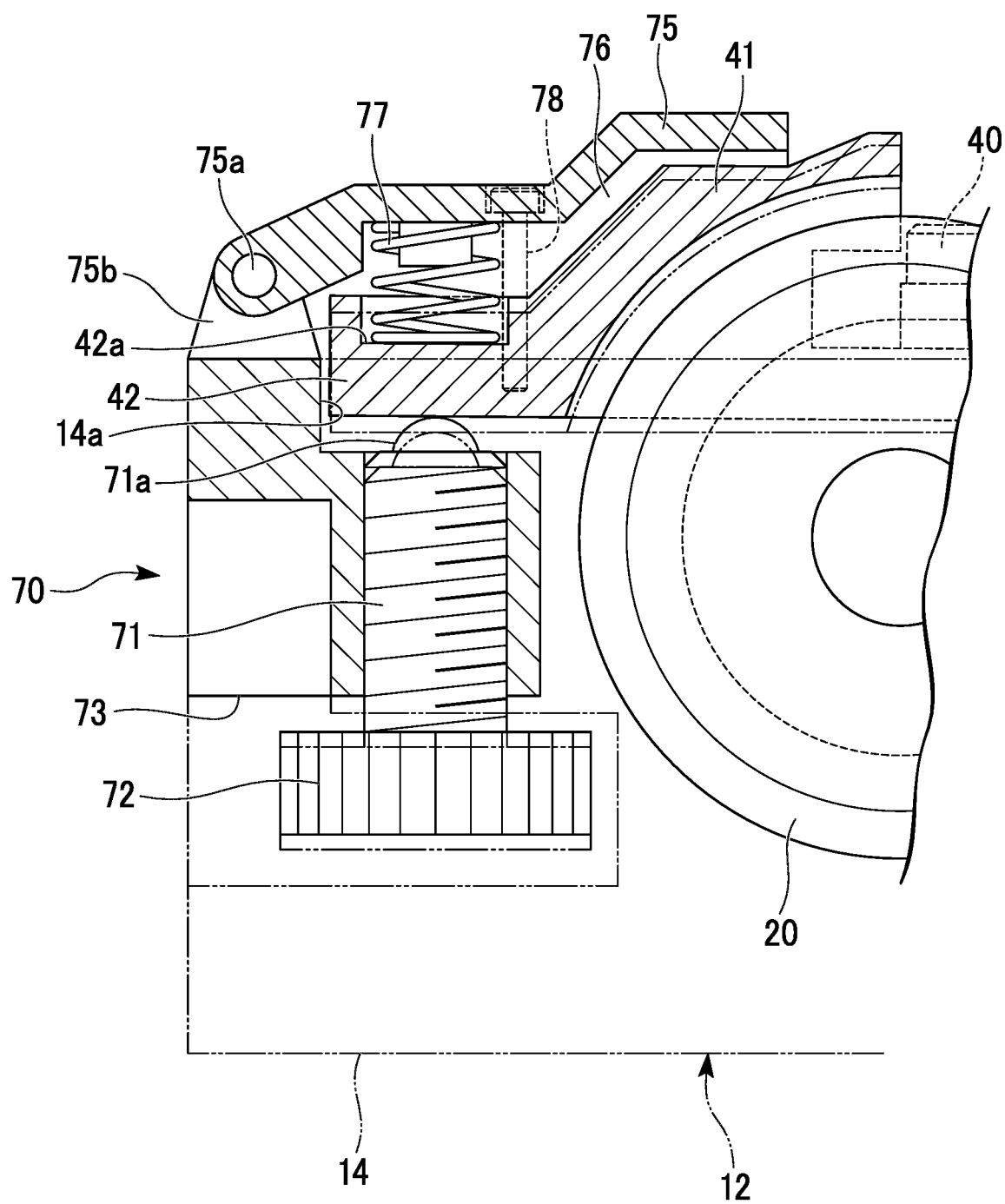
FIG. 6 is an enlarged cross-sectional view showing an example of a displacement mechanism.
Figure 7:
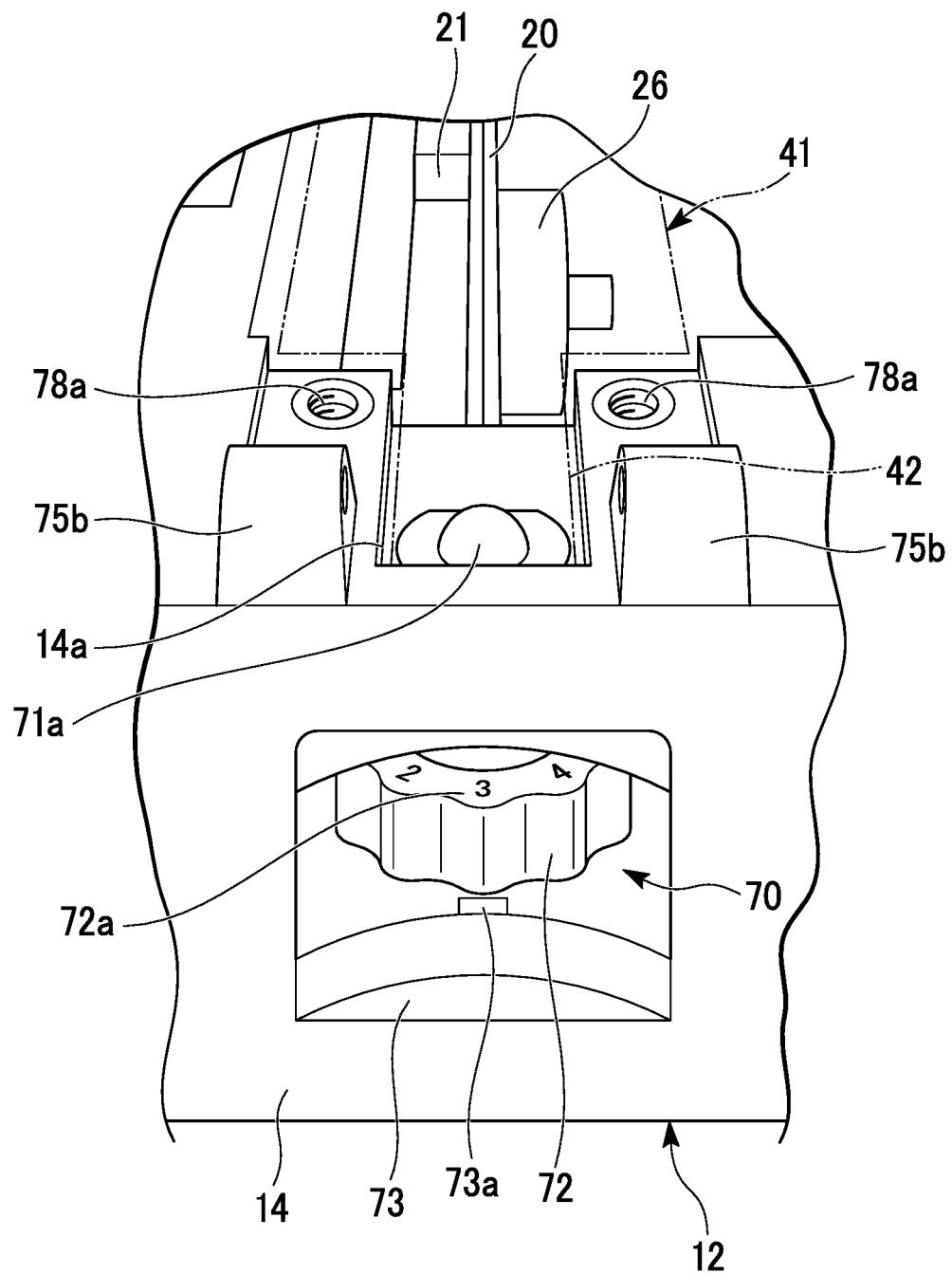
FIG. 7 is a partial front view showing an example of the displacement mechanism.

FIG. 6 is an enlarged cross-sectional view showing a displacement mechanism 70, and FIG. 7 is a front view showing a portion of the displacement mechanism 70. As shown in FIGS. 1 and 2, the displacement mechanism 70 of one or more embodiments is provided on near the distal end 42 of the lower gripping member 41. Here, the distal end 42 is an end that is opposite to a base end 43 which is near the rotation shaft member 16. The displacement mechanism 70 includes a vertical member 71 formed as a screw or the like that is vertically movable and a manipulating knob 72 configured to manipulate the vertical member 71. The lower gripping member 41 vertically moves in conjunction with a vertical movement of a distal end 71a of the vertical member 71, and thus a relative height difference between the blade member 20 and the lower gripper 40 is changed. Therefore, a height of the blade member 20 with respect to the optical fiber on the lower gripper 40 can be precisely adjusted. In particular, when the blade edge is worn down, by raising the height of the blade member 20, it is possible to restore the size of a scratch on a cladding surface of the optical fiber 80 and reuse the worn blade member 20. Even when the height adjustment of the blade member 20 is performed after completion of work such as replacement of the blade member 20, work can be easily performed.

Also, as described above, the lower gripper 40 is rotatable about a rotation fulcrum. A rotation fulcrum of the upper gripper 50 that is paired with the lower gripper 40 is on the same center line as the rotation fulcrum of the lower gripper 40. Therefore, the lower gripper 40 is displaced along the path facing the upper gripper 50. Thus, even when the height of the lower gripper 40 with respect to the base 12 is arbitrarily adjusted, the lower gripper 40 and the upper gripper 50 which constitute the gripping mechanism 30 can be brought into contact with each other with high precision.

A recess 73 is provided to be open around the manipulating knob 72 on a side surface of the housing 14. Therefore, it is easy to manipulate the manipulating knob 72 with fingers or the like. It is possible to provide a display of the height such that vertical change of the lower gripper 40 due to rotation of the manipulating knob 72 can be easily ascertained. In the example shown in FIG. 7, it is possible to distinguish different heights as numerical values, symbols, or the like by comparing a mark 73a provided in the recess 73 with a display portion 72a on the manipulating knob 72.

The displacement mechanism 70 is not a structure that adjusts the height of the blade member 20 with respect to the base 12 but is a structure that adjusts the height of the lower gripping member 41 with respect to the base 12. Thus, the displacement mechanism 70 can be disposed on a surface of the base 12.

Since the displacement mechanism 70 is capable of highly precise height adjustment with a simple configuration, manipulability can be improved by enlarging the manipulating knob 72 and widening the recess 73. In addition, when an outer diameter of the manipulating knob 72 is large, a manipulation amount of the manipulating knob 72 greatly increases even with a small rotation amount of the vertical member 71, and thereby highly precise height adjustment can be more reliably performed.

When the vertical member 71 or the manipulating knob 72 rotates and when positions of the mark 73a and the display portion 72a match each other, a mechanism that imparts a minute resistance force (a click feeling), a mechanism that generates sound, or the like with respect to the rotation of the manipulating knob 72 may be provided. As a specific example, providing a mechanism such as a recessed-and-projected mechanism, a ratchet, or the like between the vertical member 71 or the manipulating knob 72 and the housing 14 is adopted. Accordingly, the manipulability of the displacement mechanism 70 can be improved.

The lower gripping member 41 is constantly pushed to a downward side which is directed to the base 12 due to its own weight. Even when the optical fiber 80 is cut, the lower gripper 40 is pushed downward by the upper gripper 50. However, a cover member 75 may be provided above the displacement mechanism 70 to prevent the distal end 42 of the lower gripping member 41 from rising from the displacement mechanism 70. The cover member 75 is rotatable with respect to the housing 14 of the base 12 about a shaft member 75a provided in the longitudinal direction of the optical fiber 80.

There is a gap 76 between a lower surface of the cover member 75 and an upper surface of the lower gripping member 41 to prevent the cover member 75 from directly coming into contact with the lower gripping member 41. A pressing elastic member 77 is provided between the distal end 42 of the lower gripping member 41 and the cover member 75. A state in which a lower surface of the lower gripping member 41 is in contact with the distal end 71a of the vertical member 71 can be maintained due to an elastic force of the elastic member 77.

The cover member 75 can be fixed to the housing 14 using a fixing member 78 such as a screw or the like. Since the elastic member 77 is expandable and contractible, the height of the lower gripping member 41 is adjustable while the cover member 75 is fixed to the housing 14. As the elastic member 77, a compression spring, a torsion spring, or the like is adopted. In the shown example, a compression coil spring is employed as the elastic member 77, and a spring holder 42a is provided at the distal end 42 of the lower gripping member 41.

Furthermore, FIG. 4 shows a state in which the cover member 75 is open with respect to the housing 14 and the lower gripping member 41 is flipped up to the upper gripping member 51. A recess 14a configured to receive the distal end 42 of the lower gripping member 41, and a recess 14b at which the base end 43 is disposed may be formed on the upper surface of the housing 14.

Also, a state in which the cover member 75 is removed is shown above the displacement mechanism 70 in FIG. 7. Here, a bearing 75b configured to receive the shaft member 75a of the cover member 75 and a fixing hole 78a to which the fixing member 78 is engaged are shown. The bearing 75b and the fixing hole 78a are each disposed on both sides of the recess 14a.

Figure 8:
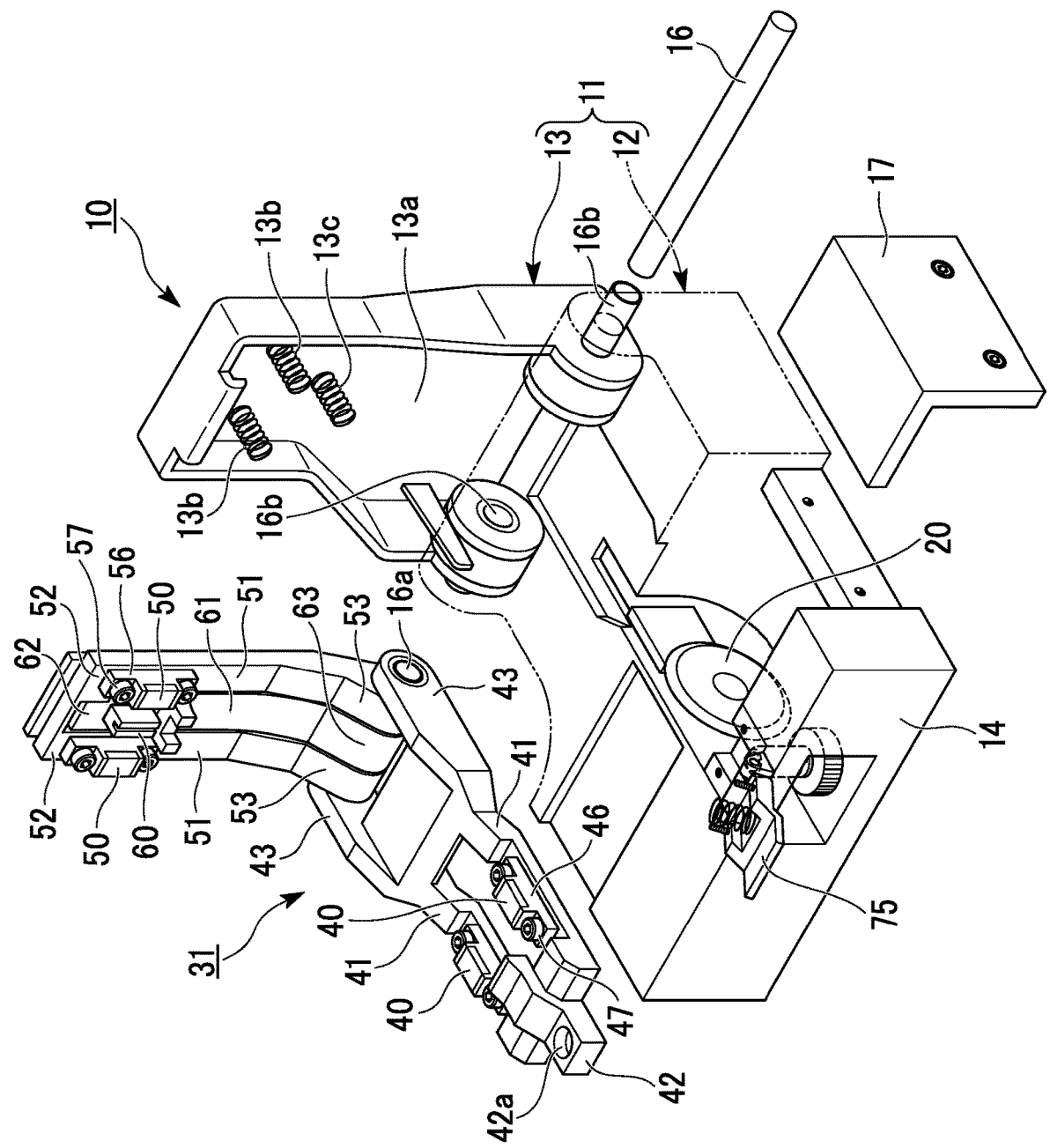
FIG. 8 is a perspective view showing a disassembled state of the optical fiber cutter of one or more embodiments.

FIG. 8 shows a disassembled state of the optical fiber cutter 10. Here, the cover member 75 is open and the cover portion 17 is detached from the housing 14. Also, a gripping mechanism member 31 including the lower gripping member 41 and the upper gripping member 51 is detached from the base 12 and the lid 13 of the device main body 11 by detaching the rotation shaft member 16 from the device main body 11. The gripping mechanism member 31 is detachable from the base 12 and the lid 13. Due to the attachment and detachment of the gripping mechanism member 31, the lower gripping member 41 which is rotatable about a rotation fulcrum is detachable from the base 12. Also, due to the attachment and detachment of the gripping mechanism member 31, the upper gripping member 51 and the pressing member 61 are detachable from the lid 13.

The gripping mechanism member 31 is integrated with the above-described gripping mechanisms 30 (refer to FIG. 2) at two positions in the longitudinal direction of the optical fiber 80 and the pressing member 61. That is, the gripping mechanism member 31 includes the two lower gripping members 41 corresponding to the two lower grippers 40, the two upper gripping members 51 corresponding to the two upper grippers 50, and the pressing member 61 corresponding to the pressing portion 60.

A rotation shaft member 16a which defines a rotational center of the lower gripping member 41, the upper gripping member 51, and the pressing member 61 is provided in the gripping mechanism member 31. Therefore, even in a state in which the gripping mechanism member 31 is detached from the device main body 11, the lower gripping member 41, the upper gripping member 51, and the pressing member 61 are integrated to be rotatable with one another in the gripping mechanism member 31. The rotation shaft member 16a may be configured such that the lower gripping member 41 and the upper gripping member 51 are less likely to be exploded due to caulking deformation or the like.

Also, a rotation shaft member 16b which defines a rotational center of the base 12 and the lid 13 is provided in the device main body 11. Thus, even in a state in which the gripping mechanism member 31 is detached from the device main body 11, the base 12 and the lid 13 are integrated to be rotatable with each other in the device main body 11.

The rotation shaft member 16a of the gripping mechanism member 31 has a cylindrical shape, and the rotation shaft member 16 can be inserted therein. Similarly, the rotation shaft member 16b of the device main body 11 has a cylindrical shape, and the rotation shaft member 16 can be inserted therein.

The gripping mechanism member 31 in which the lower gripping member 41, the upper gripping member 51, and the pressing member 61 are integrated can be collectively detached from the device main body 11 by detaching only the rotation shaft member 16. Also, the gripping mechanism member 31 and the device main body 11 can be integrated by inserting the rotation shaft member 16 inside the rotation shaft members 16a and 16b. In this case, it is unnecessary to adjust the positions of the lower gripping member 41 and the upper gripping member 51 with respect to the base 12 or the lid 13 at all.

However, there is no need to couple the lower gripping member 41, the upper gripping member 51, and the pressing member 61 via the common rotation shaft member 16a. Separate rotation shaft members may be individually provided for the lower gripping member 41, the upper gripping member 51, and the pressing member 61 so that they can be exchanged individually.

The upper gripping member 51 and the pressing member 61 may be coupled to a common shaft member and a separate shaft member may be provided for the lower gripping member. The lower gripping member 41 and the upper gripping member 51 may be coupled to a common shaft member and a separate shaft member may be provided for the pressing member 61. The lower gripping member 41 and the pressing member 61 may be coupled to a common shaft member and a separate shaft member may be provided for the upper gripping member 51.

The upper gripping member 51 includes a base end 53 near the rotation shaft member 16a and the distal end 52 on the opposite side of the base end 53. Also, the pressing member 61 includes a base end 63 near the rotation shaft member 16a and a distal end 62 on the opposite side of the base end 63. The rotation shaft member 16a of the gripping mechanism member 31 couples each of the base ends 43, 53, and 63 of the lower gripping member 41, the upper gripping member 51, and the pressing member 61 to one another while overlapping them in the axial direction.

The lower gripping member 41 has a rotation fulcrum of the lower gripper 40 on a virtual central axis of the rotation shaft member 16a in the base end 43. The lower gripping member 41 is a gripping member in which a single or two or more lower grippers 40 and a rotation fulcrum serving as a rotational center of the lower gripper 40 are configured as one member. The lower gripper 40 is rotatable about the rotation fulcrum. The lower gripping member 41 is configured as a separate body from the base 12 and the lid 13. A material of the lower gripping member 41 is not particularly limited, and a resin, a metal, or the like is adopted for example.

In the shown example, the lower gripping members 41 each having one lower gripper 40 are coupled to each other to be configured as one member of the lower gripping members 41 having two lower grippers 40. A configuration of the gripping mechanism member 31 is not limited thereto, and the two lower gripping members 41 and 41 each having one lower gripper 40 may be independently rotatable with respect to the rotation shaft member 16a.

The upper gripping member 51 has a rotation fulcrum of the upper gripper 50 at a virtual central axis of the rotation shaft member 16a in the base end 53. The upper gripping member 51 is a gripping member in which a single or two or more upper grippers 50 and a rotation fulcrum serving as a rotational center of the upper gripper 50 are configured as one member. The upper gripper 50 is rotatable about the rotation fulcrum. The upper gripping member 51 is configured as a separate body from the base 12 and the lid 13. A material of the upper gripping member 51 is not particularly limited, and a resin, a metal, or the like is adopted for example.

In the shown example, the upper gripping members 51 each having one upper gripper 50 are coupled to each other to be configured as one member of the upper gripping member 51 having two upper grippers 50. A configuration of the gripping mechanism member 31 is not limited thereto, and the two upper gripping members 51 and 51 each having one upper gripper 50 may be independently rotatable with respect to the rotation shaft member 16a.

It is possible that the upper gripper 50 and the lower gripper 40 which face each other in the gripping mechanism 30 be configured to be rotatable about a rotation fulcrum on the same center line. Thus, since each of the upper gripper 50 and the lower gripper 40 take a path rotating around the same center line, the upper gripper 50 and the lower gripper 40 can be brought into contact with each other with high precision. When the two gripping mechanisms 30 are configured as different gripping members, center lines passing through rotation fulcrums of each gripping mechanism 30 may be deviated from each other. When the two gripping mechanisms 30 are configured as one gripping mechanism member 31, it is possible that the positions of the center lines passing through the rotation fulcrums of each gripping mechanism 30 be the same.

The pressing member 61 has a rotation fulcrum of the pressing portion 60 at the virtual central axis of the rotation shaft member 16a in the base end 63. The pressing member 61 is a member in which the pressing portion 60 and a rotation fulcrum serving as a rotational center of the pressing portion 60 are configured as one member. The pressing member 61 is configured as a separate body from the base 12 and the lid 13. A material of the pressing member 61 is not particularly limited, and a resin, a metal, or the like is adopted for example.

Figure 9:
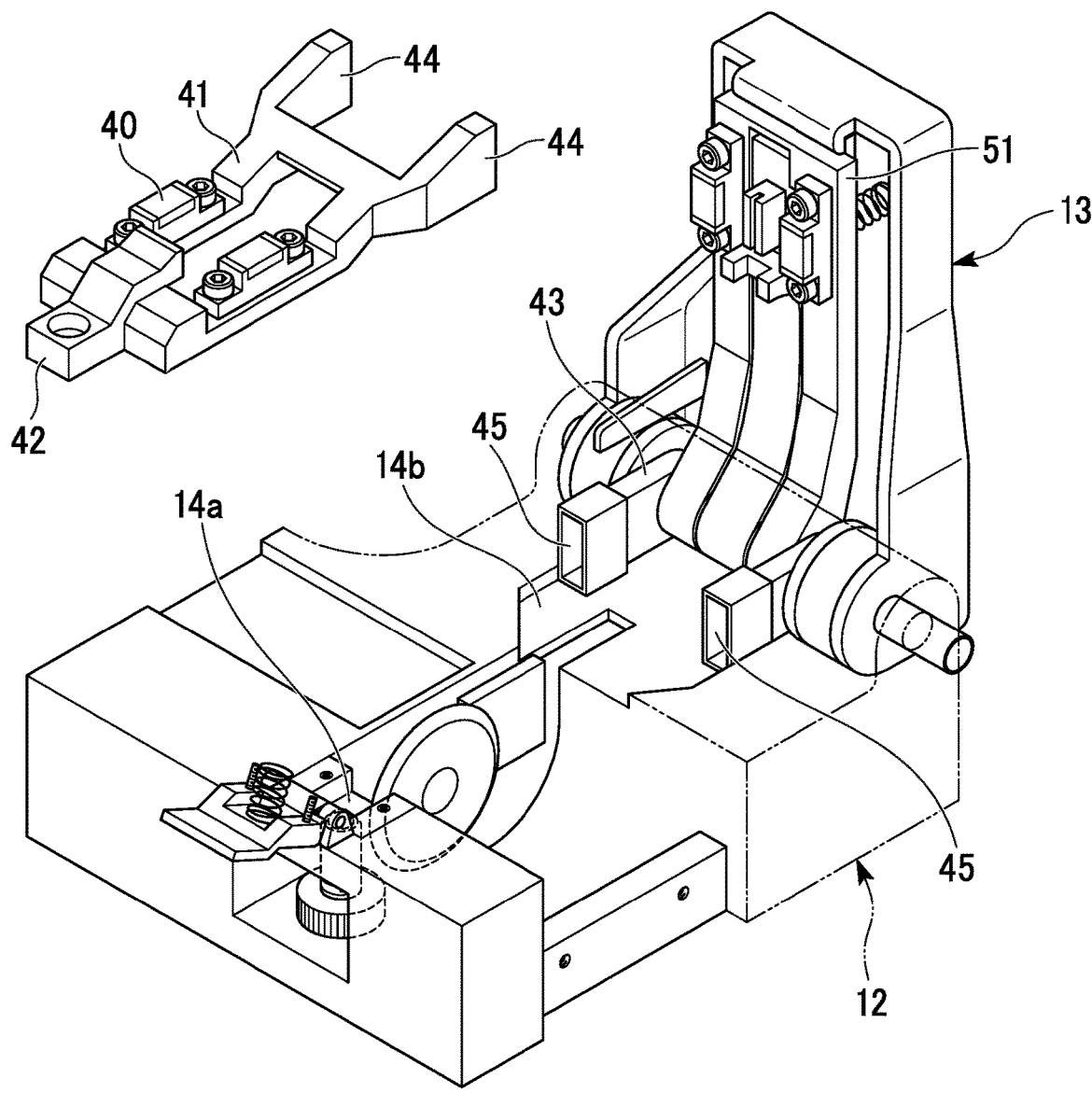
FIG. 9 is a perspective view showing an optical fiber cutter according to one or more embodiments of the invention.

FIG. 9 shows an optical fiber cutter of one or more embodiments. In one or more embodiments, a lower gripping member 41 having a lower gripper 40 and a base end 43 having a rotation fulcrum are detachable via couplers 44 and 45. Other configurations may be the same as those in previously described embodiments. The couplers 44 and 45 in the shown example are configured such that the prismatic coupler 44 is fitted to the rectangular tubular coupler 45, but a coupling mechanism is not particularly limited as long as coupling with sufficient precision is possible.

In one or more embodiments, a recess 14a which receives a distal end 42 of the lower gripping member 41 and a recess 14b at which the base end 43 is disposed are formed on an upper surface of a housing 14. The couplers 44 and 45 are disposed in the recess 14b. In a state in which the lower gripping member 41 rotates above the base 12, the lower gripping member 41 is attachable to and detachable from the base 12 by attachment/detachment of the couplers 44 and 45.

Figure 10:
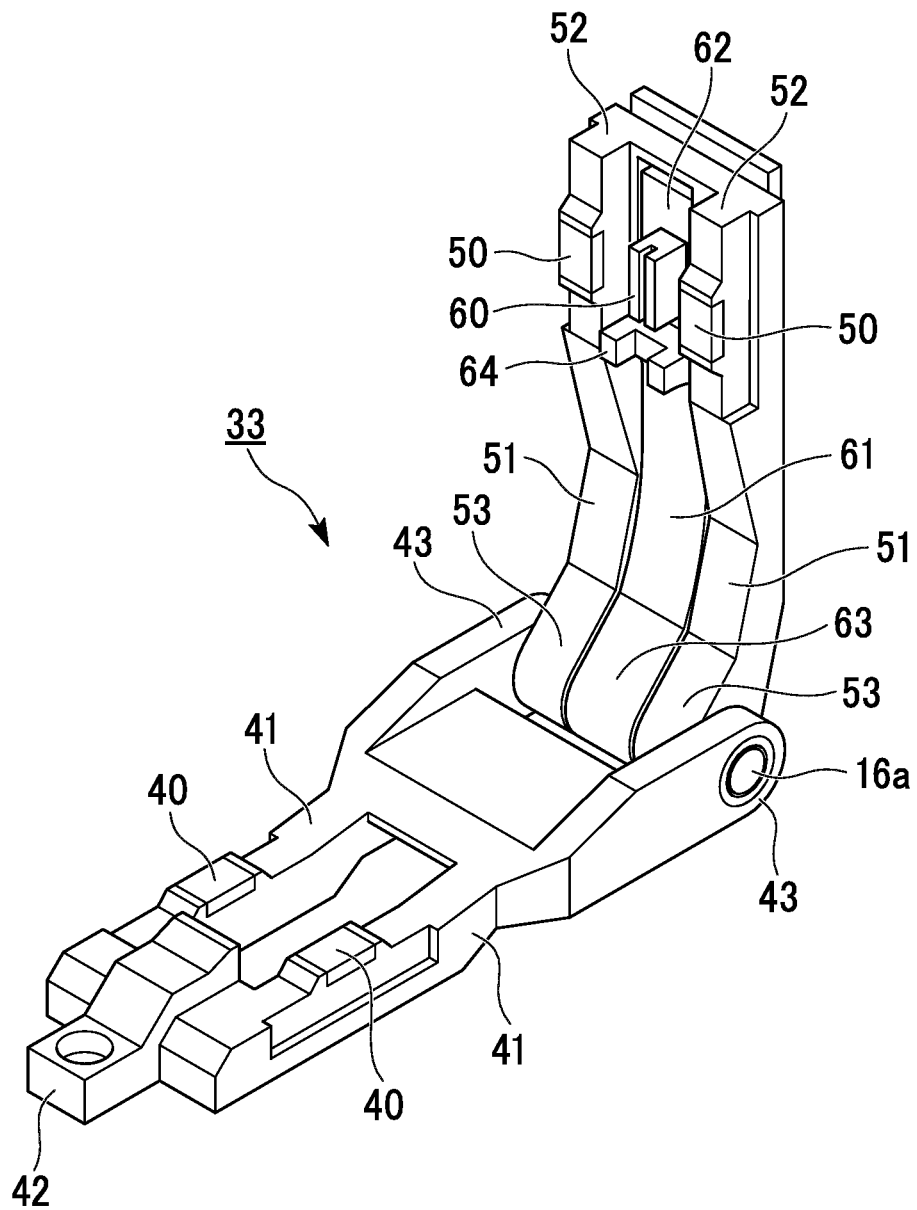
FIG. 10 is a perspective view showing another example of a gripping mechanism member.

FIG. 10 shows another example of a gripping mechanism member. A gripping mechanism member 31 shown in FIG. 8 has a configuration in which the lower gripper 40 made of an elastic member and a frame 46 which reinforces the lower gripper 40 are integrated and the frame 46 is fixed to the lower gripping member 41 using a fixing member 47 such as a screw or the like.

In a gripping mechanism member 33 shown in FIG. 10, the lower gripper 40 is fixed to the lower gripping member 41 using an adhesive or the like. The adhesive may be selected according to a combination of the lower gripper 40 made of an elastic member and the lower gripping member 41 made of a molding resin. When the lower gripping member 41 is made of a molding resin, an integrally molded configuration may be possible.

The configuration of FIG. 8 or 10 may be employed not only for the lower gripper 40 but also for the upper gripper 50. The gripping mechanism member 31 shown in FIG. 8 has a configuration in which the upper gripper 50 made of an elastic member and a frame 56 which reinforces the upper gripper 50 are integrated and the frame 56 is fixed to an upper gripping member 51 using a fixing member 57 such as a screw or the like.

In the gripping mechanism member 33 shown in FIG. 10, the upper gripper 50 is fixed to the upper gripping member 51 using an adhesive or the like. The adhesive may be selected according to a combination of the upper gripper 50 made of an elastic member and the upper gripping member 51 made of a molding resin. When the upper gripping member 51 is made of a molding resin, an integrally molded configuration may be possible.

In the case of FIGS. 8 and 10, a fixing structure of the upper gripper 50 with respect to the upper gripping member 51 is configured to be similar to a fixing structure of the lower gripper 40 with respect to the lower gripping member 41. However, in the gripping mechanism, the fixing structure of the upper gripper 50 may be different from the fixing structure of the lower gripper 40.

In the case shown in FIG. 8, when the lower gripper 40 or the upper gripper 50 is mounted on the lower gripping member 41 or the upper gripping member 51, the frame 46 or 56 to which the lower gripper 40 or the upper gripper 50 is fixed may be mounted on the lower gripping member 41 or the upper gripping member 51 using the fixing member 47 or 57. When the fixing member 47 or 57 is attachable to and detachable from the lower gripping member 41 or the upper gripping member 51, a correcting operation is facilitated in a process of manufacturing and assembling the optical fiber cutter 10, or the like.

When the lower gripper 40 or the upper gripper 50 is replaced, it is also possible to replace the lower gripping member 41 having the lower gripper 40 at two positions or the upper gripping member 51 having the upper gripper 50 at two positions in its entirety instead of detaching only the lower gripper 40 or the upper gripper 50 made of an elastic member or the like. Alternatively, it is also possible to replace the gripping mechanism member 31 or 33 including the lower gripping member 41 and the upper gripping member 51 in its entirety. In the gripping mechanism member 31 or 33, it is also possible to replace only one of the lower gripping member 41 or the upper gripping member 51 by detachably attaching a rotation shaft member 16a which couples the lower gripping member 41 and the upper gripping member 51.

Next, replacement of the gripper or the blade member of the optical fiber cutter will be described in more detail.

The cutting performance of the optical fiber cutter 10 is influenced by a size of a scratch formed on the surface of the optical fiber 80. When the scratch is excessively large, the scratch easily grows along an extension in a direction in which the scratch has been cut, which makes it difficult to obtain a cut surface that is substantially perpendicular to the longitudinal direction. On the other hand, when the scratch is excessively small, it is difficult for it to grow in a particular direction even when the optical fiber 80 on which the scratch has been formed is press-bent by the pressing portion 60 and a cut surface is likely to have an irregularly rough cut surface as if the optical fiber 80 had been torn off. Therefore, it is possible to appropriately set a height of the blade member 20 with respect to the optical fiber 80 to adjust a size of the scratch to an appropriate level.

When the optical fiber 80 is repeatedly cut, a blade edge of the blade member 20 is worn down. FIGS. 11A to 13C show schematic diagrams for describing a difference in blade height of the blade member 20 with respect to the optical fiber 80. FIGS. 12A to 12C and 13A to 13C sequentially show a state in which a circular blade member 20 comes into contact with a cladding surface of the optical fiber 80 while horizontally moving.

Figure 11A:
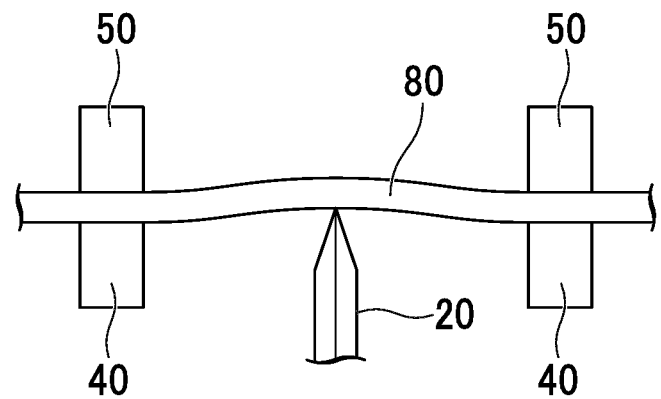
FIG. 11A is a view for describing a height of a blade with respect to an optical fiber.
Figure 12A:
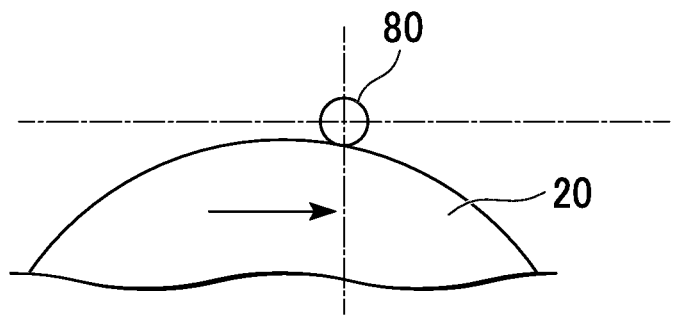
FIG. 12A is a view for describing a contact length when the blade is low.
Figure 12B:
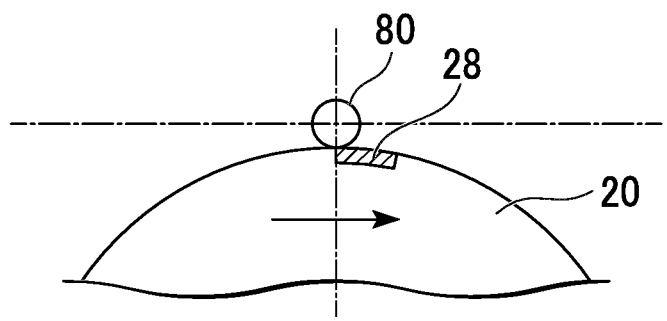
FIG. 12B is a view for describing a contact length when the blade is low.
Figure 12C:
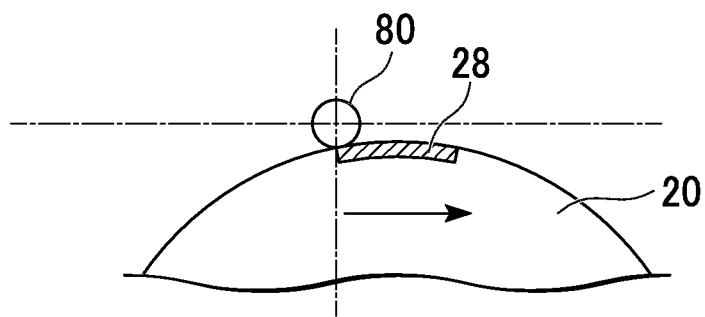
FIG. 12C is a view for describing a contact length when the blade is low.

As shown in FIG. 11A, when a height of the blade member 20 with respect to the optical fiber 80 is lowered as the blade edge of the blade member 20 wears down, a size of the scratch that is scratched on the optical fiber 80 becomes small and it is difficult to obtain a vertical cut surface. In addition, as shown in FIGS. 12A to 12C, when the height of the blade member 20 is low, a length of a contact portion 28 of the blade edge with respect to the cladding surface of the optical fiber 80 is decreased.

Figure 11B:
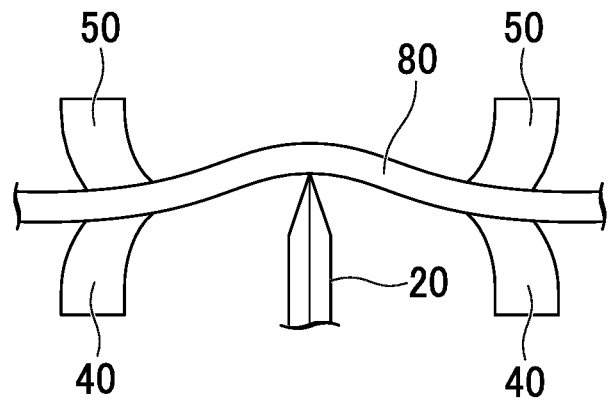
FIG. 11B is a view for describing a height of the blade with respect to an optical fiber.
Figure 13A:
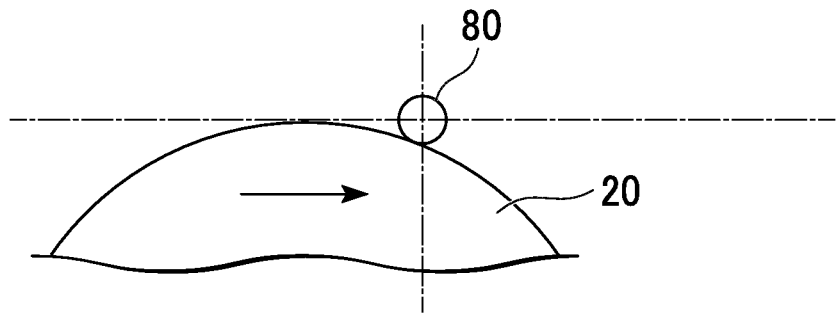
FIG. 13A is a view for describing a contact length when the blade is high.
Figure 13B:
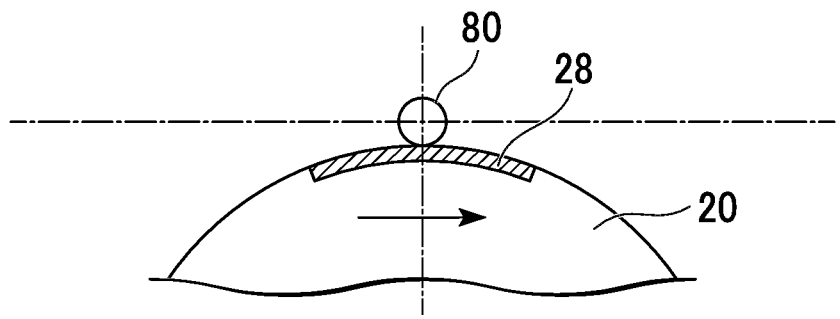
FIG. 13B is a view for describing a contact length when the blade is high.
Figure 13C:
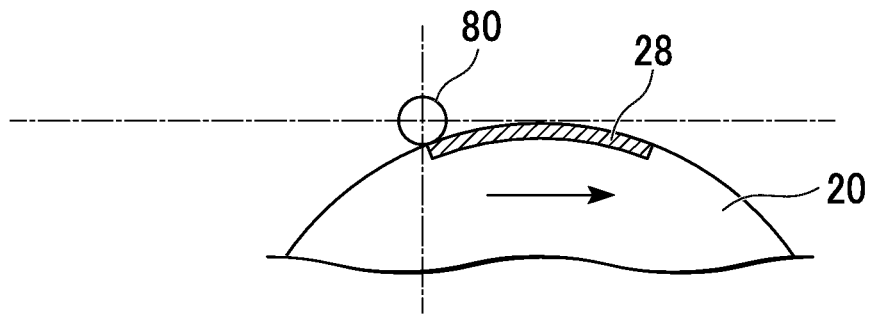
FIG. 13C is a view for describing a contact length when the blade is high.

When the blade edge wears down, by increasing the height of the blade member 20 as shown in FIG. 11B, the length of the contact portion 28 of the blade edge with respect to the cladding surface of the optical fiber 80 increases as shown in FIGS. 13A to 13C. At the same time, a contact pressure of the blade with respect to the cladding surface increases and the size of the scratch can be restored.

Therefore, it is possible that the height of the blade of the optical fiber cutter 10 be adjustable. In the case of an optical fiber for communication, since the standard value of the diameter of a cladding is 125 μm, a precision of the μm order is required for height adjustment of the blade. There are two methods that adjust a height of the blade edge, which include a method of changing a height of the blade edge and a method of changing a height of the gripper.

A conventional method of adjusting a height of a blade in an optical fiber cutter has generally been changing the height of the blade edge, but changing the height of the gripper has not been common. One of the reasons for this is a difficulty in adjusting the height of the gripper with high precision in a vertical direction.

Figure 14A:
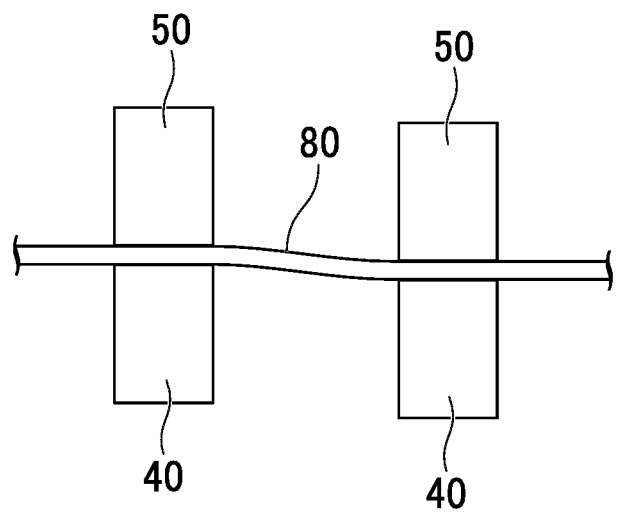
FIG. 14A is a view for describing an example of inappropriate gripping.

FIG. 14A is an example showing a state in which a height deviation is formed between the positions gripped by the lower gripper 40 and the upper gripper 50 at two positions in the longitudinal direction of the optical fiber 80.

Figure 14B:
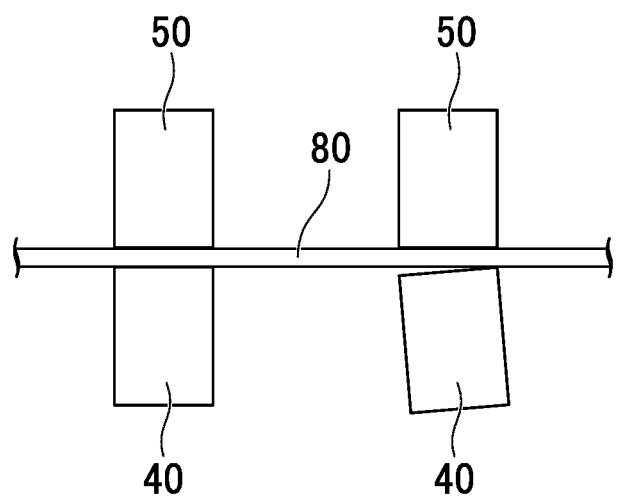
FIG. 14B is a view for describing an example of inappropriate gripping.

FIG. 14B is an example showing a state in which, when gripping surfaces of the lower gripper 40 and the upper gripper 50 are aligned to face each other on one side in the two positions in the longitudinal direction of the optical fiber 80, gripping surfaces of the lower gripper 40 and the upper gripper 50 on the other side are misaligned.

Figure 15A:
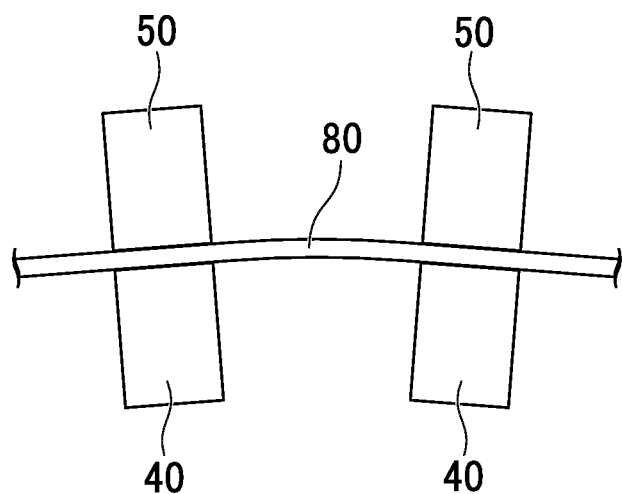
FIG. 15A is a view for describing an example of inappropriate gripping.

FIG. 15A is an example showing a state in which a portion gripped by the lower grippers 40 and the upper grippers 50 is inclined at two positions in the longitudinal direction of the optical fiber 80.

Figure 15B:
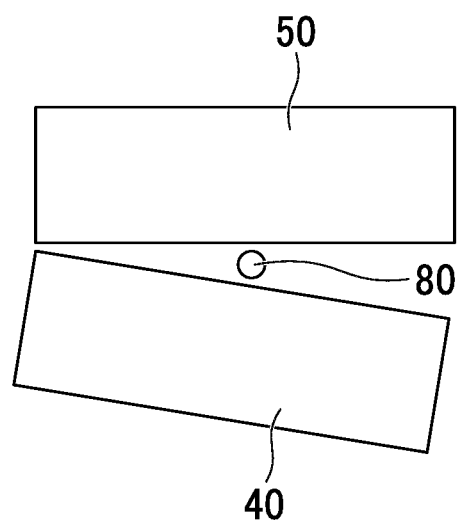
FIG. 15B is a view for describing an example of inappropriate gripping.

FIG. 15B is an example showing a state in which, when ends at one side of the lower gripper 40 and the upper gripper 50 come into contact with each other on a surface perpendicular to the longitudinal direction of the optical fiber 80, the other ends of the lower gripper 40 and the upper gripper 50 do not come into contact with each other and thus the gripping surfaces are misaligned.

When problems as shown in FIGS. 14A to 15B occur, problems occur in that a bending stress is applied in an unsuitable direction to the optical fiber 80 gripped between the lower gripper 40 and the upper gripper 50, in that a gripping force on the optical fiber 80 decreases, and a vertical cutting angle cannot be obtained, or the like.

Figure 16A:
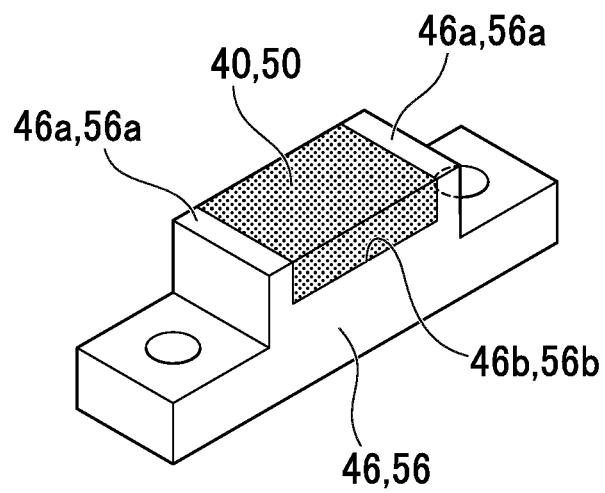
FIG. 16A is a perspective view exemplifying a gripper.
Figure 16B:
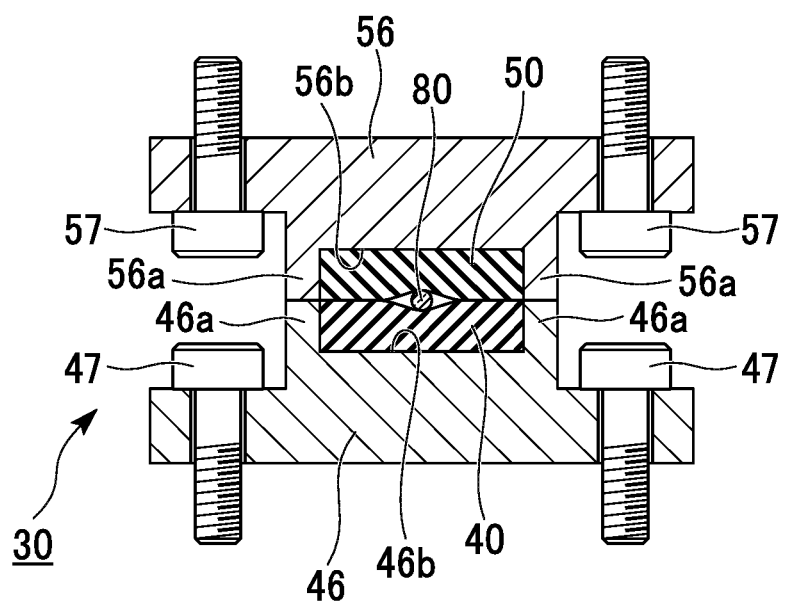
FIG. 16B is a cross-sectional view exemplifying a gripping mechanism.

FIGS. 16A and 16B show an example of the gripping mechanism 30 including the lower gripper 40 provided on near the base 12, and the upper gripper 50 provided on near the lid 13. FIG. 16A is a perspective view showing the lower gripper 40 or the upper gripper 50. FIG. 16B is a cross-sectional view showing a state in which the optical fiber 80 is gripped between the lower gripper 40 and the upper gripper 50.

In order to increase a gripping force by increasing the width with respect to the optical fiber 80, it is possible for the lower gripper 40 and the upper gripper 50 to use an elastic member. In order to facilitate handling of the elastic member, it is possible to provide the frames 46 and 56 made of a metal or the like around the elastic member. Furthermore, it is possible that the frames 46 and 56 function as stoppers for preventing excessive deformation of the elastic member when the lower gripper 40 and the upper gripper 50 grip the optical fiber 80.

In the examples shown in FIGS. 16A and 16B, the frames 46 and 56 respectively have guide portions 46*a* and 56*a* having upper ends on substantially the same plane as upper surfaces of the lower gripper 40 and the upper gripper 50 at opposite end portions perpendicular to the longitudinal direction of the optical fiber 80. The guide portions 46*a* and 56*a* are provided at positions that do not come into contact with the optical fiber 80.

The surfaces of the elastic members which configure the lower gripper 40 and the upper gripper 50 are machined such that they are parallel to each other with high precision. In addition, bottom surfaces 46*b* and 56*b* of the frames 46 and 56 are also machined such that they are parallel to each other with high precision. The height of the guide portions 46*a* and 56*a* and the distance between the surface of the elastic member and the bottom surface of the frame are also managed with high precision so as not to cause variations among components.

Hardnesses of the lower gripper 40 and the upper gripper 50 are generally the same, and the gripped optical fiber 80 can be accurately positioned at a boundary between the lower gripper 40 and the upper gripper 50. The depths to which the lower gripper 40 and the upper gripper 50 in contact with the optical fiber 80 are deformed can be the same vertically.

In a conventional optical fiber cutter, a lower gripper is fixed to a base portion. The fixing structure of the lower gripper provided at the base portion is machined with high precision so that the grippers at two positions in the longitudinal direction are on the same plane. In addition, an upper gripper provided at a lid is fixed to the lid so that upper and lower gripping surfaces are coincident when the lid is closed with respect to the base and the upper and lower gripping surfaces are made to coincide with each other. That is, the lower gripper machined with high precision is fixed to the base machined with high precision and thus a reference plane relating to gripping of the optical fiber is formed. Accordingly, it is possible to realize a gripping mechanism that does not apply a bending stress to the optical fiber.

However, when a blade member is worn down, it is necessary to change a height of the blade member. Conventionally, since the blade member is accommodated inside the optical fiber cutter, it is not easy to adjust the height according to abrasion of the blade in the method of changing the height of the gripper. It is necessary to adjust the height of the blade in μm units by rotating a screw through a gap or a hole in the base. Furthermore, in the case of a method of scratching the optical fiber while the blade member moves, the height of the blade may be deviated due to repetitive movement of the blade. When the height of the blade is not correctly adjusted, the cutting performance of the optical fiber is degraded.

Also, a blade member with its blade edge worn down needs to be replaced. However, conventionally, since the blade member is accommodated inside the optical fiber cutter, it is not easy to replace the blade member. Since a receiving surface of the base for fixing the lower gripper is a reference surface relating to the gripping of the optical fiber, in order to replace the blade member while avoiding deviation of the reference surface, it is necessary to disassemble the optical fiber cutter to take out the blade from the bottom side.

Figure 17:
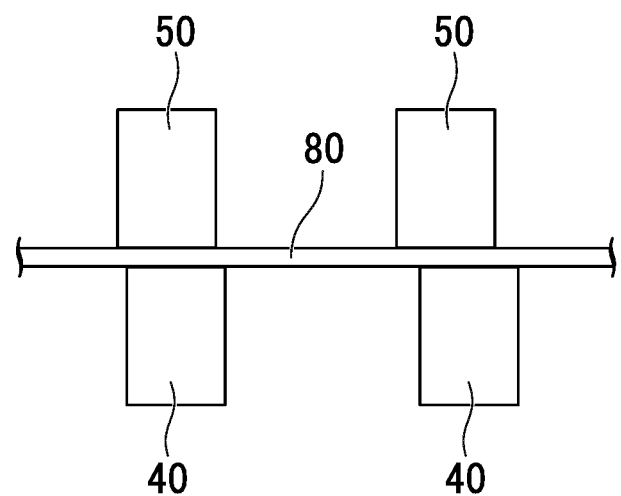
FIG. 17 is a view for describing an example of inappropriate gripping.

In addition, when the upper and lower grippers are made of an elastic material, it is necessary to periodically replace the grippers due to deformation, abrasion, or the like of the elastic material. However, in the case in which the upper gripper is fixed to the lid and the lower gripper is fixed to the base as in the conventional case, it is not easy for the upper and lower gripping surfaces to be made to coincide with each other without deviation after grippers are detached and replaced at four positions of upper, lower, left, and right. As shown in FIG. 17, for example, in the case in which the gripping surfaces of the lower gripper 40 and the upper gripper 50 do not coincide with each other, asymmetrical stress is applied to the optical fiber 80 when the optical fiber 80 is pressed by the pressing portion, and thus the cutting performance of the optical fiber 80 is degraded.

Therefore, in the optical fiber cutter of the above-described embodiments, the lower gripping member 41 or the gripping mechanism member 31 or 33 is configured as a member separate from the base 12 and is detachable from and attachable to an upper surface of the base 12. Also, the lower gripper 40 is rotatable about the rotation fulcrum. Furthermore, the displacement mechanism 70 that adjusts the height of the lower gripper 40 with respect to the base 12 is provided at the base 12. In addition, in one or more embodiments, the rotation fulcrum of the upper gripper 50 is on the same center line as the rotation fulcrum of the lower gripper 40. Furthermore, the rotation fulcrums of the lower gripper 40 and the upper gripper 50 are on the same center line as the rotation fulcrum of the portion at which the base 12 and the lid 13 are rotatably coupled to each other.

However, the rotation fulcrums of the upper gripper 50 and the lower gripper 40 may not be on the same center line as the rotation fulcrum of the position rotatably coupling the base 12 and the lid 13. It is possible to absorb variation in distance due to mismatching of the rotation fulcrums by providing an elastic member such as a spring or the like between the gripping mechanism member 31 or 33 having the upper gripper 50 and the lower gripper 40, and the device main body 11 having the base 12 and the lid 13, for example.

A positional correlation between the optical fiber 80 on the lower gripper 40 and the blade edge of the blade member 20 can be adjusted by adjusting the height of the lower gripping member 41. Therefore, there is no need to provide a height adjustment mechanism that vertically moves the blade member 20. In addition, even when the movement of the blade member 20 is repeated each time the optical fiber 80 is cut, the height adjustment of the blade member 20 does not gradually deviate.

When the blade member is accommodated inside the optical fiber cutter as in the conventional case, it is not easy to adjust the height of the blade, but according to one or more embodiments, since the rotatable lower gripping member 41 is positioned on the upper surface of the base 12, the height of the blade member 20 can be easily adjusted by rotating the lower gripping member 41 with respect to the base 12.

Since the height of the lower gripper 40 with respect to the blade member 20 is adjusted by the rotation of the lower gripping member 41, even when the lower gripping member 41 is vertically displaced, the upper surface of the lower gripper 40 is not inclined in the longitudinal direction of the optical fiber 80.

Replacement of the blade member 20 is facilitated by greatly rotating the lower gripping member 41 and flipping it up from the upper surface of the base 12.

When the elastic member constituting the lower gripper 40 becomes worn down, replacement can be easily performed by performing operations such as detaching the rotation shaft member 16 which constitutes the rotation fulcrum and replacing the lower gripping member 41 or the gripping mechanism member 31 or 33 as one component. It is unnecessary to adjust the height of the lower gripper 40 with respect to the base 12 after the lower gripper 40 is replaced.

When the rotation fulcrum of the lower gripper 40 and the rotation fulcrum of the upper gripper 50 are on the same center line, even when the lower gripper 40 is vertically displaced, it always coincides with the upper gripper 50.

When the elastic member constituting the upper gripper 50 becomes worn down, replacement can be easily performed by performing operations such as detaching the rotation shaft member 16 which constitutes the rotation fulcrum and replacing the upper gripping member 51 or the gripping mechanism member 31 or 33 as one component. It is unnecessary to adjust the height of the upper gripper 50 with respect to the lid 13 after the upper gripper 50 is replaced.

Although the invention has been described with reference to the preferred embodiments, it is not limited to the above-described embodiments, and various modifications are possible without departing from the scope of the invention. Examples of the modifications include addition, omission, change of components, and combination of components of two or more different embodiments, for example.

The above-described gripping mechanism member 31 or 33 is configured such that the lower gripping member 41 having two lower grippers 40 and the upper gripping member 51 having two upper grippers 50 are rotatably integrated with each other, but the invention is not limited thereto. For example, two or more sets of gripping mechanism members in which the lower gripping member 41 having one lower gripper 40 and the upper gripping member 51 having one upper gripper 50 are rotatably integrated may be provided.

In the case in which two or more sets of gripping mechanism members are provided, in each of the gripping mechanism members, a rotation fulcrum of the lower gripper 40 and a rotation fulcrum of the upper gripper 50 may be disposed on the same center line. In a state of being assembled onto the device main body, center lines including the rotation fulcrums of each gripping mechanism member may be disposed on the same center line.

Two or more sets of lower gripping members 41 in which one lower gripper 40 and a rotation fulcrum serving as a rotational center of the lower gripper 40 are configured as one member may be provided. In a state of being assembled onto the device main body, center lines including the rotation fulcrum of each lower gripping member 41 may be disposed on the same center line. Each lower gripper 40 included in each lower gripping member 41 may be rotatable interlockingly.

Two or more sets of upper gripping members 51 in which one upper gripper 50 and a rotation fulcrum serving as a rotational center of the upper gripper 50 are configured as one member may be provided. In a state of being assembled onto the device main body, center lines including the rotation fulcrum of each upper gripping member 51 may be disposed on the same center line. Each upper gripper 50 included in each upper gripping member 51 may be rotatable interlockingly.

When two sets of the lower gripping members 41 are independently rotatable with respect to each other, the displacement mechanism 70 may be provided to each lower gripping member 41. For example, a first displacement mechanism 70 that vertically displaces only the distal end 42 of the first lower gripping member 41 which is one of the two sets of lower gripping members 41 and a second displacement mechanism 70 that vertically displaces only the distal end 42 of the second lower gripping member 41 which is the other one of the two sets of lower gripping members 41 may be provided.

The height of each lower gripping member 41 may be adjusted in conjunction with one displacement mechanism with respect to two or more sets of the lower gripping members 41 which are rotatable independently of each other. For example, one displacement mechanism 70 may vertically displace the distal end 42 of the first lower gripping member 41 and the distal end 42 of the second lower gripping member 41 in conjunction with each other.

The optical fiber cutter can include two or more members selected from (1) a lower gripping member 41 having one lower gripper 40, (2) a lower gripping member 41 having two or more lower grippers 40, (3) an upper gripping member 51 having one upper gripper 50, (4) an upper gripping member 51 having two or more upper grippers 50, and (5) a pressing member 61 having a pressing portion 60. These two or more members can be integrated in a mutually rotatable state by being coupled at a portion of the rotation fulcrum, and further, the two or more members are detachably attached to the base 12, the lid 13, or the device main body 11.

The members (1) and (2) may be detachably attached to the base 12 or the device main body 11. The members (3) to (5) may be detachably attached to the lid 13 or the device main body 11.

In the case in which the optical fiber cutter includes two or more members selected from the members (1) to (5), at least one member may be detachably attached to the base 12 or the lid 13, at least one member may be rotatable with respect to the base 12 or the lid 13, and at least one member may be fixed to or integrated with the base 12 or the lid 13.

Each of the lower gripping member 41, the upper gripping member 51, and the pressing member 61 described in (1) to (5) may be formed with a single component and may be configured with two or more components. Two or more components may be fixed or coupled to each other to form a single integrated member.

INDUSTRIAL APPLICABILITY

The optical fiber cutter of the invention can be used for cutting an optical fiber in fusion-splicing, inspection, and the like, of an optical fiber.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERAL 10 optical fiber cutter
11 device main body 12 base
13 lid
20 blade member
30 gripping mechanism
40 lower gripper
41 lower gripping member
42 distal end of lower gripping member
43 base end of lower gripping member
50 upper gripper
51 upper gripping member
52 distal end of upper gripping member
53 base end of lower gripping member
60 pressing portion
61 pressing member
62 distal end of pressing member
63 base end of pressing member
70 displacement mechanism
72 manipulating knob
75 cover member
80 optical fiber

The invention claimed is:

1. An optical fiber cutter comprising:
a device main body that includes a lid rotatably mounted with respect to a base and that grips an optical fiber;
a first gripping mechanism comprising:
a first lower gripper disposed on a lower gripping member; and
a first upper gripper disposed on the lid;
a second gripping mechanism comprising:
a second lower gripper disposed on the lower gripping member; and
a second upper gripper disposed on the lid, wherein
the second gripping mechanism faces the first gripping mechanism in a longitudinal direction of the optical fiber;
a movable blade member that scratches a surface of the optical fiber gripped between the first lower gripper and the first upper gripper from the base; and
a pressing portion that presses the optical fiber scratched by the blade member to cut the optical fiber, wherein
the first lower gripper is separate from the base and is rotatable about a rotation fulcrum of the first lower gripper,
a rotation fulcrum of the first upper gripper is paired with the rotation fulcrum of the first lower gripper and is on a same center line as the rotation fulcrum of the first lower gripper,
a rotation fulcrum of the second lower gripper is a rotational center common to the first lower gripper and the second lower gripper,
the lower gripping member includes the rotation fulcrum of the first lower gripper on a base end of the lower gripping member,
the base includes a displacement mechanism that displaces a distal end of the lower gripping member opposite to the base end of the lower gripping member, and
the displacement mechanism includes a vertical member that is vertically movable and a manipulating knob that manipulates the vertical member.

2. The optical fiber cutter according to claim 1, wherein the rotation fulcrum of the second lower gripper is a rotational center of the first lower gripper.

3. The optical fiber cutter according to claim 2, wherein each of the rotation fulcrum of the first lower gripper and the rotation fulcrum of the second lower gripper is on the base end, and
the base includes two displacement mechanisms that vertically displace a distal end of the first gripping mechanism and a distal end of the second gripping mechanism that are opposite to the base end.

4. The optical fiber cutter according to claim 2, wherein each of the rotation fulcrum of the first lower gripper and the rotation fulcrum of the second lower gripper is on the base end, and
the base includes a displacement mechanism that vertically displaces a distal end of the first gripping mechanism and a distal end of the second gripping mechanism that are opposite to the base end, in conjunction with each other.

5. The optical fiber cutter according to claim 3, wherein each of the rotation fulcrum of the first lower gripper and the rotation fulcrum of the second lower gripper is disposed on the same center line.

6. The optical fiber cutter according to claim 5, wherein the first lower gripper and the second lower gripper are rotatable in conjunction with each other.

7. The optical fiber cutter according to claim 5, wherein the first upper gripper faces the first lower gripper,
the second upper gripper faces the second lower gripper, and
the first upper gripper and the second upper gripper are rotatable in conjunction with each other.

8. The optical fiber cutter according to claim 1, wherein the pressing portion is separate from the lid, and
the pressing portion, the first upper gripper, and the first lower gripper are rotatable about the same center line.

9. The optical fiber cutter according to claim 1, wherein a rotation fulcrum of the lid is disposed on the same center line as the rotation fulcrum of the first upper gripper and the rotation fulcrum of the first lower gripper.

10. The optical fiber cutter according to claim 1, further comprising
two or more members selected from a group consisting of:
a first lower gripping member including the first lower gripper;
a second lower gripping member including the first lower gripper and the second lower gripper;
a first upper gripping member including the first upper gripper;
a second upper gripping member including the first upper gripper and the second upper gripper; and
a pressing member including the pressing portion, wherein
the selected two or more members are:
integrated in a mutually rotatable state by being coupled at a portion of the rotation fulcrum of the first lower gripper; and
respectively attached in a detachable manner to the base and the lid.

11. The optical fiber cutter of claim 1, wherein the lower gripping member rotatable about the rotation fulcrum of the first lower gripper is detachably attached to the base.

* * * * *